US012270135B2

(12) United States Patent
Newman et al.

(10) Patent No.: US 12,270,135 B2
(45) Date of Patent: *Apr. 8, 2025

(54) NONWOVEN FABRIC HAVING A SINGLE LAYER WITH A PLURALITY OF DIFFERENT FIBER TYPES, AND AN APPARATUS, SYSTEM, AND METHOD FOR PRODUCING SAME

(71) Applicant: Fitesa Simpsonville, Inc., Simpsonville, SC (US)

(72) Inventors: Marc Newman, Simpsonville, SC (US); Fabio Baldissera, Simpsonville, SC (US); Rene Ruschel, Greer, SC (US); Yu Xin, Greer, SC (US)

(73) Assignee: Fitesa Simpsonville, Inc., Simpsonville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,722

(22) Filed: Jan. 5, 2024

(65) Prior Publication Data

US 2024/0183088 A1 Jun. 6, 2024

Related U.S. Application Data

(63) Continuation of application No. 17/572,271, filed on Jan. 10, 2022, now Pat. No. 11,913,151.

(Continued)

(51) Int. Cl.
*B32B 37/15* (2006.01)
*D01D 5/08* (2006.01)
(Continued)

(52) U.S. Cl.
CPC ............ *D04H 3/033* (2013.01); *D01D 5/082* (2013.01); *D04H 3/007* (2013.01); *D04H 3/16* (2013.01);
(Continued)

(58) Field of Classification Search
CPC ............... B32B 37/15; B32B 2250/20; B32B 2262/0253; B32B 2305/18; D01D 5/082;
(Continued)

(56) References Cited

U.S. PATENT DOCUMENTS 6,053,719 A 4/2000 Barbier et al.
6,103,181 A * 8/2000 Berger ................... D01D 5/082
425/72.2 X (Continued)

OTHER PUBLICATIONS

ISR mailed Mar. 30, 2022, International Application No. PCT/US2022/011999.

(Continued)

*Primary Examiner* — Leo B Tentoni

(57) ABSTRACT

One or more aspects of the disclosure provides a nonwoven fabric comprising a single layer in which the single fabric layer comprises a plurality of different fibers in which each fiber type has desired functionality. In one aspect, a system for preparing a nonwoven fabric having a single fabric layer in which the single fabric layer comprises a plurality of different fiber types, is provided. The system includes a spin beam having a zoned distribution plate disposed upstream of a spinneret, the zoned distribution plate includes a plurality of distribution apertures arranged in zones, wherein each zone is configured and arranged to extrude a plurality of polymer streams that are of a different polymer type than polymer streams extruded by an adjacent zone to the spinneret to form a single layer having two or more types of fibers that are of a different type from each other.

23 Claims, 21 Drawing Sheets

Related U.S. Application Data

(60) Provisional application No. 63/136,122, filed on Jan. 11, 2021.

(51) Int. Cl.
  *D01D 5/22* (2006.01)
  *D01D 5/32* (2006.01)
  *D01D 5/34* (2006.01)
  *D01D 7/00* (2006.01)
  *D04H 3/005* (2012.01)
  *D04H 3/007* (2012.01)
  *D04H 3/033* (2012.01)
  *D04H 3/16* (2006.01)

(52) U.S. Cl.
  CPC ... *B32B 2250/20* (2013.01); *B32B 2262/0253* (2013.01); *B32B 2305/18* (2013.01)

(58) Field of Classification Search
  CPC .. D01D 5/22; D01D 5/32; D01D 5/34; D01D 7/00; D01D 13/00; D01D 13/02; D04H 3/005; D04H 3/007; D04H 3/16

USPC ............... 425/72.2, 131.5, 377, 382.2, 471; 156/441, 501
  See application file for complete search history.

(56) References Cited

U.S. PATENT DOCUMENTS

| | | | | |
|---|---|---|---|---|
| 6,964,931 | B2* | 11/2005 | Carlyle | D04H 3/16 |
| | | | | 442/364 |
| 7,740,777 | B2* | 6/2010 | Wilkie | D01D 5/30 |
| | | | | 425/72.2 X |
| 2003/0124939 | A1 | 7/2003 | Zafiroglu et al. | |
| 2005/0082723 | A1* | 4/2005 | Brock | D04H 3/04 |
| | | | | 264/439 |
| 2011/0250815 | A1 | 10/2011 | Pourdeyhimi | |
| 2015/0123304 | A1* | 5/2015 | Ashraf | D04H 3/16 |
| | | | | 264/103 |

OTHER PUBLICATIONS

Written Opinion mailed Mar. 30, 2022, International Application No. PCT/US2022/011999.

International Preliminary Report on Patentability, mailed Mar. 30, 2022, International Application No. PCT/US2022/011999.

* cited by examiner

NONWOVEN FABRIC HAVING A SINGLE LAYER WITH A PLURALITY OF DIFFERENT FIBER TYPES, AND AN APPARATUS, SYSTEM, AND METHOD FOR PRODUCING SAME

CROSS-REFERENCE TO RELATED APPLICATIONS

The present application claims the benefit of U.S. application Ser. No. 17/572,271, filed Jan. 10, 2022, now U.S. Pat. No. 11,913,151, which claims the benefit of Provisional Application No. 63/136,122 filed Jan. 11, 2021, the contents of which are hereby incorporated by reference in its entirety.

FIELD

The presently-disclosed invention relates generally to nonwoven fabrics, and more particularly to a nonwoven fabric having a stratified fabric layer having two or more regions of targeted functionality.

BACKGROUND

Nonwoven fabrics are used in a variety of applications such as garments, disposable medical products, and absorbent articles such as diapers and personal hygiene products, among others. New products being developed for these applications have demanding performance requirements, including comfort, conformability to the body, freedom of body movement, good softness and drape, adequate tensile strength and durability, and resistance to surface abrasion, pilling or fuzzing. Accordingly, the nonwoven fabrics which are used in these types of products must be engineered to meet these performance requirements.

In some circumstances, it may also be desirable for the nonwoven fabrics to exhibit different properties or a mix of properties within the nonwoven fabric. To achieve this goal, it is typically necessary to combine multiple layers of fabrics to form a composite structure. This typically involves the use of multiple spin beams for preparing multiple nonwoven layers in which each individual layer imparts a desired property to the resulting composite nonwoven fabric.

In addition to the use of multiple spin beams, the individual layers must also be joined together, for example, through the use of thermal, mechanical, or chemical lamination techniques.

The use of multiple spin beams necessarily increases the complexity and costs associated with preparing nonwoven fabrics exhibiting different properties at different areas of the nonwoven fabric.

Despite significant efforts in developing nonwoven fabrics, there is still a need for products exhibiting multiple properties and functionalities.

SUMMARY

One or more embodiments of the invention provides a nonwoven fabric comprising a single layer in which the single fabric layer comprises a plurality of different fibers in which each fiber type has desired functionality.

In certain embodiments, aspects of the invention are directed to a system for preparing a nonwoven fabric having a single fabric layer in which the single fabric layer comprises a plurality of different fiber types, the system comprising: a first polymer source configured to provide a stream of a molten or semi-molten first polymer; a second polymer source configured to provide a stream of a molten or semi-molten second polymer, wherein the first polymer and the second polymer are of a different type; a spin beam in fluid communication with the first and second polymer sources, the spin beam including a zoned distribution plate disposed upstream of a spinneret, the zoned distribution plate(s) comprising a plurality of distribution apertures arranged in zones, wherein each zone is configured and arranged to extrude a plurality of polymer streams that are of a different polymer type than polymer streams extruded by an adjacent zone to the spinneret; and a collection surface disposed below the spinneret onto which continuous filaments are deposited to form a single layer comprising two or more types of fibers that are of a different type from each other.

In some embodiments, the zoned distribution plate comprises 2 to 10 zones, such as from 2 to 4 zones, or 2 to 3 zones.

In some embodiments, the zoned distribution plate includes a first zone configured to produce multicomponent filaments, and a second zone configured to produce monocomponent filaments. In some embodiments, the first polymer source comprises a polypropylene and the second polymer source comprises a different polypropylene.

In certain embodiments, the zoned distribution plate comprises a first zone configured to produce crimped filaments, and a second zone configured to produce non-crimping or low crimping filaments. In a preferred embodiment, the first polymer source comprises a metallocene catalyzed propylene and the second polymer source comprises a Ziegler-Natta catalyzed polypropylene. In some embodiments, the first polymer source comprises a blend of a standard spunbond polypropylene (e.g., melt flow rate from 20 to 40 g/10 min) and a polypropylene based additive such as a high melt flow rate polypropylene (e.g., a melt flow rate from about 500 to 2,000 g/10 min) or a polypropylene having low isotacticty.

In certain embodiments, the zoned distribution plate comprises a plurality of zones extending longitudinally in the cross direction of the spin beam. In some embodiments, the zoned distribution plate comprises a plurality of zones extending laterally in the machine direction of the spin beam.

In some embodiments, the system may further comprise a third polymer source and/or fourth polymer source in fluid communication with the spin beam in which the third polymer and or fourth polymer sources are configured to provide a stream of a molten or semi-molten third and/or fourth polymer.

In some embodiments, the first polymer source comprises a first polypropylene polymer and the second polymer source comprises a second polypropylene that is different than the first polypropylene.

In certain embodiments, the first distribution zone is configured to extrude a polymer stream comprising monocomponent filaments, and the second distribution zone is configured to extrude a polymer stream having a sheath/core configuration comprising the first and second polypropylene polymers.

In some embodiments, the first polymer source comprises a first polymer and the second polymer source comprises a second polymer that is blended with a functional additive that is not blended with the first polymer. Examples of functional additives may include colorants, UV stabilizers, hydrophobic agents, hydrophilic agents, antistatic agent, elastomers, compatibilizers antioxidants, anti-block agent, slip agent, optical brighteners, flame retardants, and antimicrobial agents.

In certain embodiments, the first distribution zone has from about 20 to 40 rows of distribution apertures arranged in the cross direction of the spin beam, and the second distribution zone has from about 20 to 40 rows arranged in the cross direction of the spin beam.

In some embodiments, the ratio of the number of rows of distribution apertures in the first distribution zone to the number of rows of distribution apertures in the second distribution zone is from 10:9- to 90:10, and in particular, from 30:70 to 70:30, and more particularly, from about 50:50.

In some embodiments, the zoned distribution plate includes a third distribution zone, and the second distribution zone is sandwiched between the first and third distribution zones.

In certain embodiments of the invention, the first and third distribution zones are in fluid communication with the first polymer source. In one embodiment, the first and second distribution zones are configured to produce low crimping or non-crimping filaments, and the second distribution zone is configured to produce crimped filaments.

In certain embodiments, the system is configured to produce a stratified fabric layer having two or more regions of a different fiber type. In these embodiments, the stratified fabric layer is extruded from the spin beam as a single layer.

In certain embodiments, the system may be configured to produce a nonwoven fabric layer having a plurality of fiber types and in which the plurality of fiber types are comingled though out a thickness of the fabric layer.

In some embodiments, the system may also include a bonding unit for bonding the fibers together to form a coherent fabric. Examples of bonding include thermal, mechanical, and chemical bonding. In one embodiment, the bonding unit comprises a calender bonding unit.

Embodiments of the invention are also directed to the use of the inventive system and zoned distribution plate in the manufacture of nonwoven fabrics.

In one embodiment, the invention is directed to the use of a nonwoven fabric having a plurality of different fiber types in the manufacture of an absorbent article. In particular, embodiments of the invention may be directed to the use of the system having a zoned distribution plate in the manufacture of an absorbent article.

Embodiments of the invention are also directed to a zoned distribution plate for use in a spunbond system to prepare a spunbond nonwoven fabric having a plurality of different fiber types within a single fabric layer.

In certain embodiments, the invention is directed to a system for preparing a nonwoven fabric having a stratified fabric layer, the system comprising a first polymer source configured to provide a stream of a molten or semi-molten first polymer; a second polymer source configured to provide a stream of a molten or semi-molten second polymer, wherein the first polymer and the second polymer are of a different type; a spin beam in fluid communication with the first and second polymer sources, the spin beam including a zoned distribution plate disposed upstream of a spinneret, the zoned distribution plate comprising a plurality of distribution apertures arranged in zones, wherein each zone is configured and arranged to extrude a plurality of polymer streams that are of a different polymer type than polymer streams extruded by an adjacent zone to the spinneret; and a collection surface disposed below the spinneret onto which continuous filaments are deposited to form a stratified nonwoven fabric in which the stratified fabric comprises a single layer having two or more regions in which the fibers adjacent regions are of a different type from each other.

In one embodiment of the system for preparing a stratified fabric layer, the zoned distribution plate includes a first zone configured to produce multicomponent filaments, and a second zone configured to produce monocomponent filaments. In some embodiments, the zoned distribution plate comprises 2 to 10 zones.

In certain embodiments of the system for preparing a stratified fabric layer, the zoned distribution plate comprises a first zone configured to produce crimped filaments, and a second zone configured to produce non-crimping or low crimping filaments. In one embodiment, the zoned distribution plate comprises a plurality of zones extending longitudinally in the cross direction of the spin beam. In some embodiments, the zoned distribution plate comprises a plurality of zones extending laterally in the machine direction of the spin beam.

In certain embodiments of the system for preparing a stratified fabric layer, the system further comprising a third polymer or a fourth polymer source in fluid communication with the spin beam, and in which the third and/or fourth polymer sources are configured to provide a stream of a molten or semi-molten third and/or fourth polymer.

Aspects of the invention are also directed to a method of preparing a nonwoven fabric having a single fabric layer in which the single fabric layer comprises a plurality of different fiber types, the method comprising: providing a first polymer source configured to provide a stream of a molten or semi-molten first polymer; providing a second polymer source configured to provide a stream of a molten or semi-molten second polymer, wherein the first polymer and the second polymer are of a different type; introducing the first polymer stream and the second polymer stream into a spin beam in fluid communication with the first and second polymer sources, the spin beam including a zoned distribution plate (or stack of distribution plates) disposed upstream of a spinneret, the zoned distribution plate comprising a plurality of distribution apertures arranged in zones, wherein each zone is configured and arranged to extrude a plurality of polymer streams that are of a different polymer type than polymer streams extruded by an adjacent zone to the spinneret; extruding a first stream of the first polymer from the spinneret as first continuous filaments; extruding a second stream of the second polymer from the spinneret as second continuous filaments; and collecting the first and second continuous filaments on a collection surface disposed below the spinneret to form a single layer comprising the first and second continuous filaments that are of a different type from each other.

In some embodiments of the method, the zoned distribution plate comprises 2 to 10 zones.

In certain embodiments of the method, the zoned distribution plate includes a first zone configured to produce multicomponent filaments, and a second zone configured to produce monocomponent filaments. In one embodiment, the first polymer source comprises a polypropylene and the second polymer source comprises a polypropylene. The polypropylene of the first polymer source and the second polymer source may be different or the same.

In certain embodiments of the method, the zoned distribution plate includes a first zone configured to produce monocomponent filaments, and a second zone configured to produce monocomponent filaments in which the polymer may be the same or different in each polymer stream.

In some embodiments, the method includes a step of extruding the first polymer stream through a first zone of the zoned distribution plate to produce crimped filaments, and extruding the second polymer stream through a second zone of the zoned distribution plate to produce non-crimping or low crimping filaments.

In some embodiments, the step of extruding the first and second polymer streams through a first zone comprising side-by-side, IOS, segmented pie, or sheath/core (concentrically or non-concentrically) configured cross-sections of the zoned distribution plate to produce crimped filaments while simultaneously extruding the first and/or second polymer streams through a second zone of the zoned distribution plate(s) configured to produce non-crimping or low crimping filaments.

In some embodiments of the method, the zoned distribution plate comprises a plurality of zones extending longitudinally in the cross direction of the spin beam.

In certain embodiments of the method, the zoned distribution plate comprises a plurality of zones extending laterally in the machine direction of the spin beam.

In one embodiment, the method further comprises the step of providing a third polymer source in fluid communication with the spin beam, the third polymer source configured to provide a stream of a molten or semi-molten third polymer. In still other embodiments, the method comprises providing a fourth polymer source in fluid communication with the spin beam, the fourth polymer source configured to provide a stream of a molten or semi-molten third polymer.

In certain embodiments of the method, the first polymer source comprises a first polypropylene polymer and the second polymer source comprises a second polypropylene that is different than the first polypropylene.

In one embodiment, the first distribution zone is configured to extrude a polymer stream comprising monocomponent filaments, and the second distribution zone is configured to extrude a polymer stream having a sheath/core configuration comprising the first and second polypropylene polymers.

In certain embodiments of the method, the first polymer source comprises a first polymer and the second polymer source comprises a second polymer that is blended with a functional additive that is not blended with the first polymer.

Examples of functional additives that may be blended with one or more of the polymer sources include colorants, UV stabilizers, hydrophobic agents, hydrophilic agents, antistatic agent, elastomers, compatibilizers antioxidants, anti-block agent, slip agent, optical brighteners, flame retardants, and antimicrobial agents.

In some embodiments of the method, the first distribution zone has from about 10 to 50, such as from about 20 to 40, rows of distribution apertures arranged in the cross direction of the spin beam, and the second distribution zone has from about 10 to 50, such as from about 20 to 40 rows arranged in the cross direction of the spin beam.

In one embodiment, the ratio of the number of rows of distribution apertures in the first distribution zone to the number of rows of distribution apertures in the second distribution zone is from 10:90 to 90:10, such as from 30:70 to 70:30, and in particular, from about 50:50.

In certain embodiments of the method, the zoned distribution plate includes a third distribution zone, and the second distribution zone is sandwiched between the first and third distribution zones. In one embodiment, the first and third distribution zones are in fluid communication with the first polymer source.

In one embodiment of the method, the first and second distribution zones are configured to produce low crimping or non-crimping filaments, and the second distribution zone is configured to produce crimped filaments.

In one embodiment, the method is configured to produce a stratified fabric layer having two or more regions of a different fiber type.

In certain embodiments of the invention, the spin beam is configured to produce a nonwoven fabric layer having a plurality of fiber types and in which the plurality of fiber types are comingled though out a thickness of the fabric layer.

In certain embodiments, the method comprising a step of bonding the fibers of the fabric to form a coherent fabric, such as thermal bonding, mechanical bonding, or chemical bonding.

In one embodiment, aspects of the invention are directed to the use of the methods described herein in the manufacture of a nonwoven fabric.

In a further aspect, a spunbond nonwoven fabric having a single fabric layer comprising a plurality of continuous filaments bonded together to form a coherent web is provided in which the plurality of continuous filaments comprises a first fiber type and a second fiber type that is different than the first fiber type.

In certain embodiments, the fiber types are comingled though out a thickness of the single fabric layer. In some embodiments, the single fabric layer is a stratified fabric layer in which the first fiber type is predominately disposed in a first region of the stratified fabric layer, and the second fiber type is predominately disposed in a second region of the stratified fabric layer.

In some embodiments, the single fabric layer of the spunbond nonwoven fabric may comprise a third fiber type.

In certain embodiments, the first fiber type comprises multicomponent filaments, and the second fiber type comprises monocomponent filaments. In one embodiment, the first fiber type comprises a polypropylene and the second fiber type comprises a polypropylene. In one such embodiment, first fiber type comprises crimped filaments, and the second fiber type comprises non-crimping or low crimping filaments.

In some embodiments, the first fiber type comprises a first polypropylene polymer and the second fiber type comprises a second polypropylene that is different than the first polypropylene.

In certain embodiments, the first fiber type comprises multicomponent filaments having a sheath/core configuration comprising a first and second polypropylene polymers and the second fiber type comprises monocomponent filaments comprising the first polypropylene polymer. In some embodiments, multicomponent filaments comprise bicomponent fibers having a side-by-side, eccentric sheath/core, IOS, segmented pie, or D-centric sheath/core configuration.

In certain embodiments of the spunbond nonwoven fabric, the first fiber type comprises a first polymer and the second fiber type comprises a second polymer that is blended with a functional additive that is not blended with the first polymer. Examples of functional additives may include colorants, UV stabilizers, hydrophobic agents, hydrophilic agents, antistatic agent, elastomers, compatibilizers antioxidants, anti-block agent, slip agent, optical brighteners, flame retardants, and antimicrobial agents.

In yet a further aspect, embodiments of the invention are directed to a multilayered composite sheet material in which the sheet material includes at least one spunbond layer in accordance with embodiments of the invention. That is, a spunbond fabric having a single layer with a plurality of different fiber types.

In some embodiments, the composite sheet material comprises the inventive spunbond fabric and at least one meltblown fabric layer joined to a surface of the spunbond fabric. For instance, in some embodiments a composite sheet material is provided in which the inventive spunbond fabric layer is sandwiched between two meltblown layers.

In other embodiments, the composite sheet material comprises at least one meltblown layer that is sandwiched between two spunbond layers, wherein at least one of the spunbond layers comprises said single fabric layer comprising a first fiber type and a second fiber type that is different than the first fiber type.

In certain embodiments of the composite sheet material, the spunbond fabric layer having the single fabric layer comprises both crimped and non-crimping or low crimping filaments.

BRIEF DESCRIPTION OF THE SEVERAL DRAWINGS

Having thus described the invention in general terms, reference will now be made to the accompanying drawings, which are not necessarily drawn to scale, and wherein:

DETAILED DESCRIPTION

Figure 1:
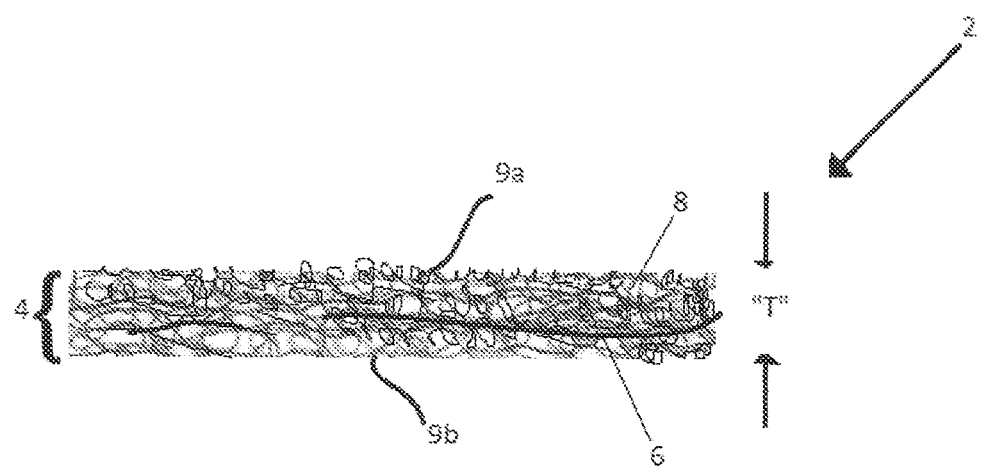
FIG. 1 illustrates a nonwoven fabric having a single layer in accordance with at least one embodiment of the invention.

The invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the invention.

It is understood that where a parameter range is provided, all integers within that range, and tenths and hundredths thereof, are also provided by the invention. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%.

As used herein, the terms "about," "approximately" and "substantially" in the context of a numerical value or range means ±10% of the numerical value or range recited or claimed, and in particular, encompasses values within a standard margin of error of measurement (e.g., SEM) of a stated value or variations ±0.5%, 1%, 5%, or 10% from a specified value.

For the purposes of the present application, the following terms shall have the following meanings:

The term "fiber" can refer to a fiber of finite length or a filament of infinite length.

As used herein, the term "monocomponent" refers to fibers formed from one polymer or formed from a single blend of polymers. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The at least two polymers can each independently be the same or different from each other, or may be a blend of polymers. The polymers are arranged in substantially constantly positioned distinct zones across the cross-section of the fibers. The components may be arranged in any desired configuration, such as sheath-core, side-by-side, pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference.

As used herein the terms "nonwoven," "nonwoven web" and "nonwoven fabric" refer to a structure or a web of material which has been formed without use of weaving or knitting processes to produce a structure of individual fibers or threads which are intermeshed, but not in an identifiable, repeating manner. Nonwoven webs have been, in the past, formed by a variety of conventional processes such as, for example, meltblown processes, spunbond processes, and staple fiber carding processes.

As used herein, the term "meltblown" refers to a process in which fibers are formed by extruding a molten thermoplastic material through a plurality of fine, usually circular, die capillaries into a high velocity gas (e.g. air) stream which attenuates the molten thermoplastic material and forms fibers, which can be to microfiber diameter. Thereafter, the meltblown fibers are carried by the gas stream and are deposited on a collecting surface to form a web of random meltblown fibers. Such a process is disclosed, for example, in U.S. Pat. No. 3,849,241 to Buntin et al.

As used herein, the term "laminate" refers to a nonwoven fabric that includes two or more layers that are joined, directly or indirectly, to form a composite sheet material.

As used herein, the term "machine direction" or "MD" refers to the direction of travel of the nonwoven web during manufacturing.

As used herein, the term "cross direction" or "CD" refers to a direction that is perpendicular to the machine direction and extends laterally across the width of the nonwoven web.

As used herein, and unless indicated to the contrary, the term "molecular weight" refers to the weight average molecular weight (Mw), and is expressed in grams/mol. The weight average molecular weight can be determined using commonly known techniques, such as gel permeation chromatography (GPC).

As used herein, the term "spunbond" refers to a process involving extruding a molten thermoplastic material as filaments from a plurality of fine, usually circular, capillaries of a spinneret, with the filaments then being attenuated and drawn mechanically or pneumatically. The filaments are deposited on a collecting surface to form a web of randomly arranged substantially continuous filaments which can thereafter be bonded together to form a coherent nonwoven fabric. The production of spunbond non-woven webs is illustrated in patents such as, for example, U.S. Pat. Nos. 3,338,992; 3,692,613, 3,802,817; 4,405,297 and 5,665,300. In general, these spunbond processes include extruding the filaments from a spinneret, quenching the filaments with a flow of air to hasten the solidification of the molten filaments, attenuating the filaments by applying a draw tension, either by pneumatically entraining the filaments in an air stream or mechanically by wrapping them around mechanical draw rolls, depositing the drawn filaments onto a foraminous collection surface to form a web, and bonding the web of loose filaments into a nonwoven fabric. The bonding can be any thermal or chemical bonding treatment, with thermal point bonding being typical.

As used herein "thermal point bonding" involves passing a material such as one or more webs of fibers to be bonded between a heated calender roll and an anvil roll. The calender roll is typically patterned so that the fabric is bonded in discrete point bond sites rather than being bonded across its entire surface.

As used herein, the terms "through air bonded" or "through air bonding" refers to a type of thermal bonding in which a material to be bonded, such as a web of fibers, is subjected to the application of heated gas, such as air, in which the temperature of the heated gas is above the softening or melting temperature of at least one polymer component of the material being bonded. The heated gas causes the at least one polymer component to soften, and under some circumstances, to become semi-molten such that polymers of adjacent fibers fuse together to form thermal bonds. Air thermal bonding may also involve passing a material through a heated oven.

As used herein the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material, including isotactic, syndiotactic and random symmetries.

I. Nonwoven Fabric Layer Having a Plurality of Different Types of Fibers

Certain embodiments of the invention are directed to spunbond nonwoven fabrics comprising at least two different fiber types disposed in a single fabric layer. By "different type of fibers" or "different fiber types" it is meant that one of the fibers of the single fabric layer, for example, is different in one or more of: 1) structure or cross-section (e.g., monocomponent or bicomponent), 2) different in composition, such as having different polymers, chemistries, or functional additives, and 3) different in properties, such as thickness, average fiber diameter, porosity, density, loft, denier, hydrophilicity/hydrophobicity, color, for example, in comparison to a fiber of a different type in the single fabric layer. For example, in some embodiments, the single fabric layer may include a first fiber type comprising multicomponent fibers, and a second fiber type comprising predominately monocomponent fibers.

In some embodiments, the different fiber types of the single fabric layer may be homogenously or heterogeneously mixed/comingled together to form the fabric layer. For example, in certain embodiments the single fabric layer comprises at least two different fiber types in which the different fibers types are mixed together such that the different fiber types are substantially comingled together throughout the thickness of the single fabric layer. In this regard, FIG. 1 illustrates a cross section of a nonwoven fabric 2 having a single fabric layer 4 comprising a first fiber 6 and a second fiber 8 in which the first and second fibers are mixed together throughout the thickness of the single fabric layer. In the illustrated embodiment shown in FIG. 1, the first fiber 6 comprises a monocomponent filament of a first fiber type, and the second fiber 8 comprises a crimped bicomponent fiber of a different fiber type than the first fiber. As discussed in greater detail below, the crimped fiber typically has a side-by-side, eccentric sheath/core, or D-centric sheath/core configuration.

The first and second fibers 6, 8 of single fabric layer 12 are extruded and deposited from a single melt spin beam so that the fibers are formed as a single layer despite having a plurality of different fiber types (e.g., two or more) in which the two different fiber types (first fibers 6 and second fibers 8) are of a different type from each other. The nonwoven fabric also includes a first exterior surface 9*a* and a second exterior surface 9*b*.

In the embodiment of FIG. 1, the first fibers and second fibers 6, 8 are shown substantially mixed together throughout the thickness "T" of the single fabric layer 4. However, it should be recognized that one or more regions may exist in which one of the fibers types is the predominant fiber in the region. For instance, in some embodiments one fiber type may be more prevalent near one of the surfaces of the single fabric layer 4. In certain embodiments, a gradient may exist in which one of the fiber types is more prevalent near one surface, and then becomes less prevalent near the opposite surface of the single fabric layer 4.

As noted above, the degree of mixing of the fibers of different types may be substantially homogeneous or may be heterogeneous. In some embodiments, the degree of mixing/comingling of the fibers of different types may range from 0 to 100%, and in particular from 10 to 90%, and more particularly, from 25 to 75% in which 0% means that there is substantially no mixing/comingling of the fibers of different types, and 100% means that the fibers of different types are homogeneously mixed throughout the thickness of the single fabric layer 4.

In some embodiments, the single fabric layer comprising a plurality of different fiber types may comprise from about 2 to 12 fiber types, more typically from 2 to 6 different fiber types, and more particularly, from about 2 to 4 different fiber types. In a preferred embodiment, the single fabric layer of the nonwoven fabric has from 2 to 3 different fiber types.

In certain embodiments, each different type of fiber may be disposed predominately within discrete regions of the single fabric layer. In this way, the nonwoven fabrics having at least one single fabric layer in which the single fabric layer comprises two or more regions in which the fibers of at least one of the regions is of a different type of fibers from fibers of another region of the stratified fabric layer.

Certain embodiments of the invention are directed to spunbond nonwoven fabrics having at least one stratified fabric layer in which the stratified fabric layer comprises two or more regions in which the fibers of at least one of the regions is of a different type of fibers from fibers of another region of the stratified fabric layer. In the stratified fabric layer, the fibers of different type are not substantially mixed such that a region of the single fabric layer comprises predominately a single type of fiber whereas a different region of the single fabric layer comprises fiber type that is different from one or more other regions of the single fabric layer. For example, in some embodiments, the stratified layer may include a first region comprising predominately multicomponent fibers, and a second region comprising predominately monocomponent fibers.

Figure 2:
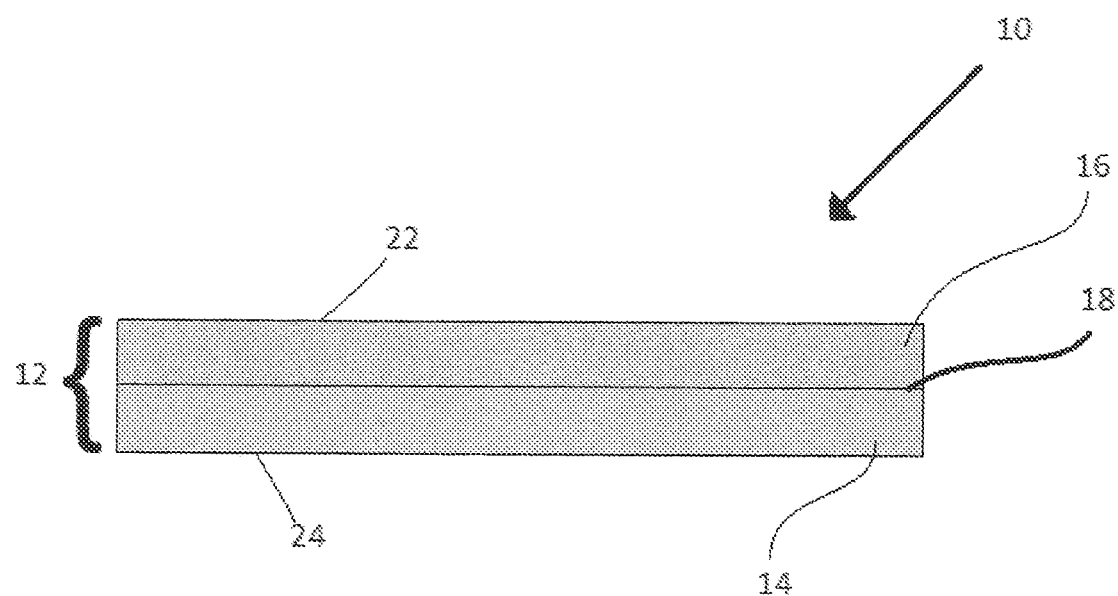
FIG. 2 illustrates a nonwoven fabric having a stratified fabric layer in accordance with at least one embodiment of the invention.

With reference to FIG. 2, an example of a nonwoven fabric having a stratified fabric layer is illustrated and broadly designated by reference character 10. Nonwoven fabric 10 comprises a stratified fabric layer 12 having a first region 14 and a second region 16 in which the fibers of first and second regions 14, 16 are of a different type from each other. The fibers of stratified fabric layer 12 are extruded and deposited from a single melt spin beam so that the fibers are formed as a single layer despite having a plurality of regions (e.g., two or more) in which the fibers of the regions are of a different type from each other. In the embodiment illustrated in FIG. 2, the second region 16 overlies the first region 14 at interface 18. The nonwoven fabric 10 includes a first exterior surface 20, and a second exterior surface 22.

As the stratified fabric layer 12 is deposited as a single layer, the interface 18 defines a boundary region within the stratified fabric layer in which the first region 14 (predominately comprising a first type of fiber) transitions to the second region 16 (predominately comprising a second type of fiber). In certain embodiments, some mixing of different types of fibers from adjacent regions may occur in the boundary region near the interface 18. Typically, each region predominately comprises a single type of fiber. For example, each region may comprise at least 75%, by weight, of one type of fiber, based on the total weight of the region, and in particular, at least 80% by weight, and more particularly, at least about 90% by weight, of one type of fiber, based on the total weight of the region.

Although FIG. 2 depicts a stratified fabric layer having two regions of different types of fibers, it should be recognized that the stratified fabric layer may include a plurality of regions of different types of fibers. For example, the stratified fabric layer may comprise 2-10 regions in which adjacent regions comprise different types of fibers. In a preferred embodiment, the stratified fabric layer may include 2 to 4 regions, and in particular, from 2 to 3 regions of different fiber types.

In some embodiments, the plurality of regions of different fiber types may extend in the cross direction of the nonwoven fabric. In other embodiments, the plurality of regions of different fiber types may extend in the machine direction of the nonwoven fabric.

As discussed in greater detail below, the single fabric layer is formed as a single layer in which fibers of at least two different fiber types are extruded from the same melt spin beam. A nonwoven fabric having two different fiber types in a single fabric layer may provide several advantages. In particular, a single spin beam can be used to prepare a single fabric layer having multiple functionalities. In comparison, to achieve a similar result in a conventional spunbond system, it would typically be necessary to include multiple spin beams in which each spin beam produces a single fabric layer having a desired property. Thereafter, these individually produced fabric layers are laminated to each other to form a composite (multilayer) nonwoven fabric. The use of multiple spin beams to achieve a desired functionality typically increases the complexity and costs associated with preparing the nonwoven fabric.

Further advantages include the ability to impart a desired functionality to only a select region of the nonwoven fabric. For example, in some embodiments, different polymers or blends of polymers may be used in the fibers of different regions of the stratified fabric layer. In still other embodiments, additives can be included in the fibers of one of the regions whereas one or more of the other regions of the stratified fabric layer do not include such additives or may include different additives. In this way, a single nonwoven fabric layer can be provided that comprises two or more regions having different functionalities or properties in comparison to other regions of the nonwoven fabric.

Examples of suitable additives include one or more of colorants, such as pigments (e.g., $TiO_2$), UV stabilizers, hydrophobic agents, hydrophilic agents, antistatic agent, elastomers, compatibilizers antioxidants, anti-block agent, slip agent, optical brighteners, flame retardants, antimicrobials, such as silver, copper oxide and zinc oxide, polymer rheology modifiers, and the like. In certain embodiments, one or more of the polymer streams may include a polypropylene rheology modifier comprising a polypropylene having low isotacticity, such as L-MODU™ available from Idemitsu.

II. System, Apparatus, and Method for Preparing a Fabric Layer a Plurality of Fiber Types Certain embodiments of the invention are also directed to an apparatus and method of making a nonwoven fabric comprising a plurality of different fiber types in a single layer. In particular, embodiments of the invention also provide a distribution plate for use in a spunbond spin beam to make a nonwoven fabric having the inventive fabric layer. Additional embodiments of the invention are also directed to articles comprising the inventive fabric layer, and to the use of the inventive fabric layer in the manufacture of absorbent articles.

As discussed in greater detail below, nonwoven fabrics having a single fabric layer comprising a plurality of fiber types may be prepared using a spunbond spinning system in which the spin pack includes a zoned distribution plate having a plurality of distribution zones that are configured and arranged to supply streams of polymer to the spinneret in which a stream of polymer in one distribution zone is of a different type than the streams of polymer in one or more other distribution zones of the zoned distribution plate. As in the "different types of fibers" discussed above, the term "different type" or "different polymer types" with reference to the polymer streams, means that the polymer stream in one distribution zone, for example, is different in one or more of: 1) structure or cross section (e.g., monocomponent or multicomponent), 2) different in composition, such as having different polymers, chemistries, or functional additives, and 3) different in properties, such as hydrophilicity/hydrophobicity, color, for example, in comparison to the polymer stream of a second distribution zone and/or third distribution zone of the zoned distribution plate.

Figure 3:
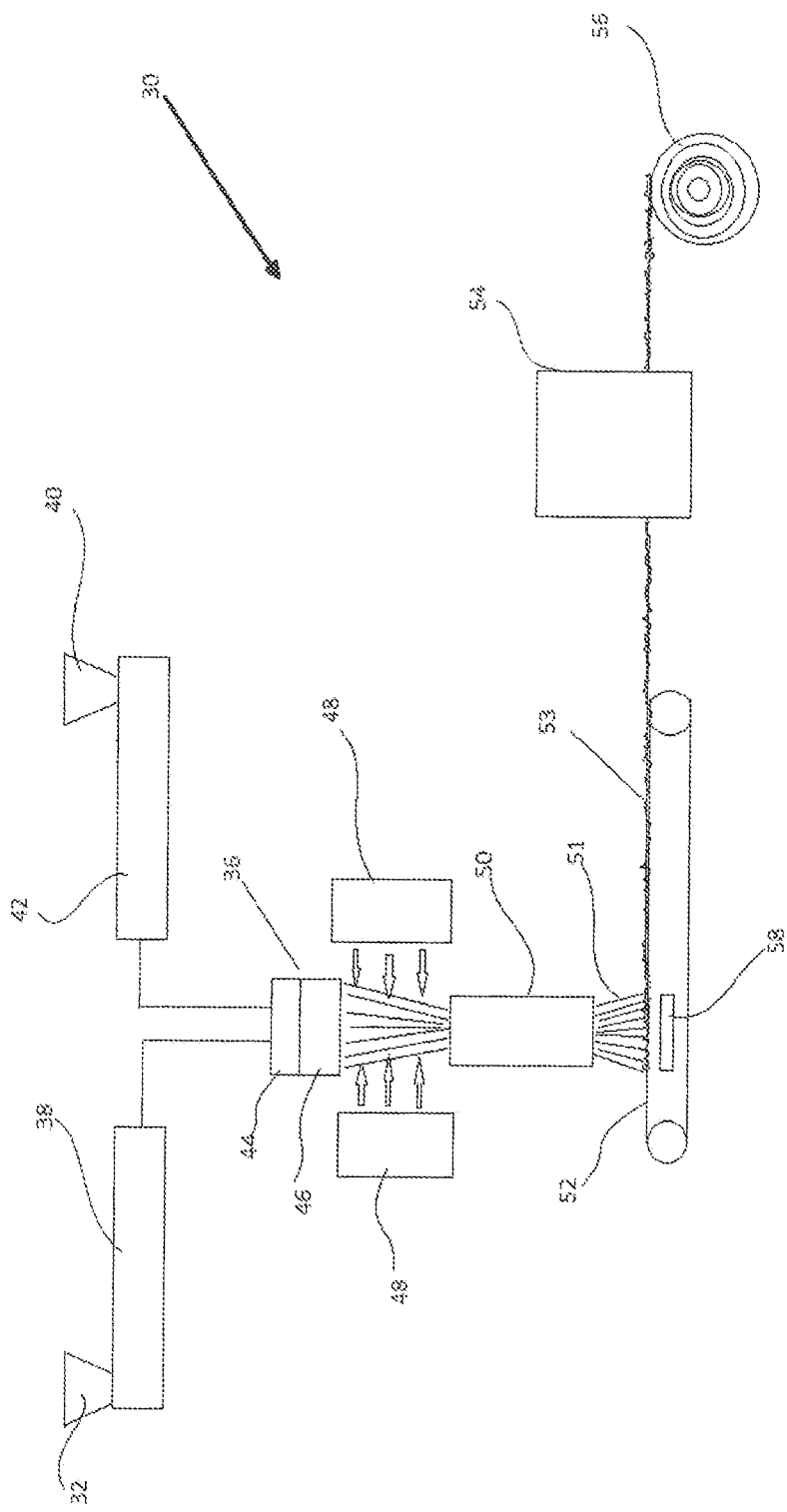
FIG. 3 illustrates a system for preparing a nonwoven fabric having a stratified fabric layer in accordance with embodiments of the present invention.

With reference to FIG. 3, for example, a system for preparing a spunbond nonwoven fabric having a comprising a single fabric layer having a plurality of different fiber types is schematically shown and designated by reference character 30.

As shown, the system includes a first polymer source (i.e., hopper 32) that is in fluid communication with a spin beam 36 via the extruder 38, and a second polymer source (i.e., hopper 40) in fluid communication with spin beam 36 via the extruder 42. In certain embodiments, the spin beam 36 includes a spin beam assembly 44 for delivering molten polymer streams to a spin pack 46, a quenching station 48, and a drawing station 50.

When present, the spin beam assembly 44 comprises a plurality of meters and pumps that deliver two or more polymer streams to the spin pack. In some embodiments, the spin beam assembly may include one or more heating elements to maintain the molten polymer streams at a desired temperature. An example of a spin beam assembly that may be used in certain embodiments of the invention is described in U.S. Pat. No. 7,740,777, the contents of which are hereby incorporated by reference.

In the spin pack 46, at least two molten polymer streams of a different type are distributed to plurality of orifices (e.g., spinnerets) from which the molten polymer streams are extruded as a curtain of continuous or semi-continuous filaments. In certain embodiments, the extruded filaments are then introduced into the quenching station in which the filaments are exposed to quenching air streams directed at the filaments. The filaments are then drawn into a drawing station 50, which draws and attenuates the filaments. The drawn and attenuated filaments 51 then are deposited onto a collection surface 52 to form a nonwoven web 53. In some embodiments, the drawn filaments may be introduced into a diffuser (not shown) prior to being deposited onto the collection surface.

In certain embodiments, the nonwoven web may be passed through a bonding station 54 in which the filaments are bonded to form a coherent web. A wide variety of bonding methods may be used in accordance with the invention including thermal bonding (e.g., through air bonding or calender bonding), mechanical bonding (e.g., hydroentanglement or needle punching) and chemical bonding (e.g., use of an adhesive resin). In one embodiment, the bonding station comprises a thermal bonding unit comprising a pair of opposing calender rolls.

In certain embodiments, the bonding unit comprises a chamber in which the nonwoven fabric is exposed to a stream of heated gas, such as air, and in which the temperature of the heated gas is above the softening or melting temperature of at least one polymer component of the nonwoven fabric.

In some embodiments, the bonding unit may comprise a hot air knife which is configured to subject the nonwoven fabric to a stream of heated air that thermally bonds adjacent fibers to each other.

In further embodiments, the bonding unit may comprise one or more hydraulic entanglement units which are configured to subject the nonwoven fabric to streams of high pressure water that causes the fibers to intertwine and mechanically bond together.

In some embodiments, the system may also include a pair of cooperating rolls (not shown) (also referred to herein as a "press roll") positioned downstream from the outlet of the spin beam. In this regard, the press roll may be configured to stabilize the web of filaments by compressing web prior to delivering the web of fibers from the outlet of the spin beam towards the bonding unit. In some embodiments, for example, the press roll may include a ceramic coating deposited on a surface thereof. In certain embodiments, for instance, one roll of the pair of cooperating rolls may be positioned above the collection surface 52, and a second roll of the pair of cooperating rolls may be positioned below the collection surface 52.

In some embodiments and as shown in FIG. 3, the system may comprise a vacuum source 58 disposed below the collection surface 52 for pulling the plurality of continuous filaments from the outlet of the spin beam onto the collection surface before delivery to the bonding unit.

Finally, the bonded spunbond nonwoven fabric moves to a winder 56, where the fabric is wound onto rolls.

Although FIG. 3 only shows two polymer sources (e.g., two hoppers/extruders) for providing two molten polymeric streams to the spin beam, it should be recognized that the system may include additional polymer sources (additional hoppers and extruders) for supplying additional molten polymeric streams to the spin beam. In one embodiment, the system may include three polymer sources for providing three molten polymeric streams to the spin beam.

In some embodiments, the system may include additional devices for further modifying or treating the nonwoven fabric. For example, the system may include a kiss roller or similar device for applying topical treatments, such as a surfactant, to a surface of the nonwoven fabric. In some embodiments, the system may also include one or more devices for incrementally stretching the fabric. An example of such a device is a ring roller, which comprises a plurality of intermeshing rings that stretch select regions of the fabric.

The system depicted in FIG. 3 may be configured to produce a single fabric layer in which the plurality of fibers of different types are homogeneously or heterogeneously blended. In some embodiments in the preparation of a stratified fabric layer, such as that depicted in FIG. 2, the collection surface may be run at higher speeds to help facilitate distribution of the fibers of different types into discrete regions within the single fabric layer. Alternatively, or in combination, the stream of continuous filaments extruded by the spin beam may be deposited onto a rotating cylinder. In some embodiments, the surface of the rotating cylinder may comprise a screen, which may include a vacuum source.

Figure 4:
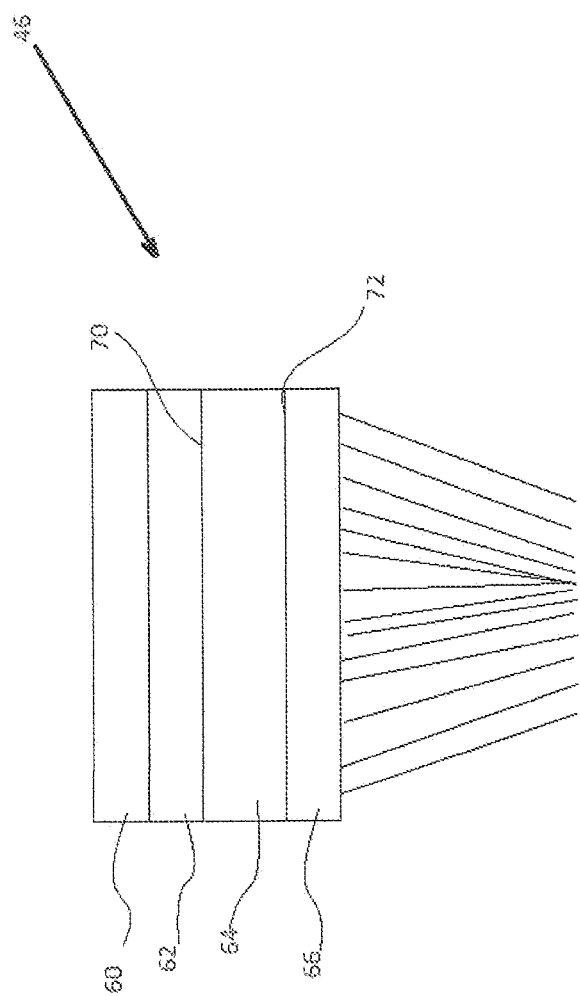
FIG. 4 illustrates a spin pack for use in the system illustrated in FIG. 3.

FIG. 4 shows a schematic illustration of a spin pack 46 in accordance with at least one embodiment of the invention. The spin pack 46 typically includes a plurality of plates that are sandwiched together in the following order: a top plate 60, a polymer melt screen 62, zoned distribution plate 64, and a spinneret 66. The spin pack basically coordinates the flow of molten polymer streams to form 1) a desired type of fiber (e.g., monocomponent fibers or multicomponent fibers, fibers having a particular cross-sectional geometric configuration, etc.) 2) a desired number of fibers that are continuously extruded by the system, and 3) to distribute the molten polymer into a desired distribution zone based on the polymer type.

The polymer melt screen 62 is provided with filters for filtering the polymer streams prior to introduction into the zoned distribution plate 64.

The spinneret is disposed downstream of the polymer melt screen 62 and the zoned distribution plate 64. The spinneret comprises a plurality of spinning orifices that are arranged in arrays extending in the cross-direction of the spin beam. For example, the spinneret orifices may be arranged in a substantially horizontal, rectangular array, typically from 1,000 to 6,000 orifices per meter of length of the spinneret. As used herein, the term "spinneret" refers to the lower most portion of the spin pack that delivers the molten polymer to and through orifices for extrusion into the quenching station. The spinneret can be implemented with holes drilled or etched through a plate or any other structure capable of issuing the required fiber streams.

Additionally, the spinneret orifices may include a variety of different shapes (e.g., round, square, oval, keyhole shaped, multi-lobal, such as trilobal, etc.), resulting in varying types of resultant fiber cross-sectional geometries. An exemplary spin pack for use with system 30 is described in U.S. Pat. No. 5,162,074 to Hills, the disclosure of which is incorporated herein by reference in its entirety. However, it is noted that any conventional or other spin pack for spinning fibers may be utilized with system 30.

Zoned distribution plate 64 includes an upper surface 70 and a lower surface 72. The upper surface 70 is disposed opposite the polymer melt screen 62, and includes a plurality of etched channels that are arranged and configured to receive two or more polymer melt streams, and then distribute the polymer streams to a desired distribution zone. In addition, the zoned distribution plate 64 may also include a plurality of channels that are configured and arranged to combine two or more different polymer melt streams into a desired configuration (e.g., bicomponent (side-by side, core/sheath, eccentric core/sheath, D-centric core/sheath, segmented pie, islands in the sea, etc.), tricomponent, and the like.

The lower surface 72 of the zoned distribution plate is disposed opposite the spinneret and includes a plurality of distribution apertures from which the distributed polymer streams are introduced into corresponding spinning orifices of the spinneret, and are then subsequently extruded as molten or semi-molten filaments.

In certain embodiments of the invention, the zoned distribution plate is configured to distribute, combine, and extrude a plurality of polymer streams of a different type, and in particular, from 2 to 4 polymer streams of a different type. For example, the zoned distribution plate may be configured to extrude polymer streams comprising four different polymers (e.g., polymers A, B, C, and D). The polymers A, B, C, and D may be distributed and extruded as monocomponent filaments, or may be combined to form multicomponent filaments that comprise combinations of two or more polymers A, B, C, and D in which the polymers are arranged as a distinct polymer component across a cross section of the polymer stream, and hence, in the resulting multicomponent fiber.

It should be recognized that reference to polymers A, B, C, and D in the following discussion is used generically and not to be limited to any specific polymer. It should also be recognized that polymer A, B, C, and D is not limited to a single polymer, but may include a blend of polymers, a blend of an additive and a polymer, and combinations thereof. In this regard, it is noted that when one or more of the polymers A, B, C, and D is a blend, the blend is typically first prepared in the extruder prior to introduction into spin beam. For example, polymer A is typically provided by a first extruder, polymer B is typically provided by a second extruder, and polymer C is typically provided by a third extruder.

In the embodiment illustrated in FIG. 3, only a single zoned distribution plate is shown. It should be recognized that zoned distribution plate 64 may comprise two or more distribution plates stacked on top of each other, and that are configured to cooperate to deliver a plurality of molten polymer streams to the distribution apertures. As discussed in greater detail below, the distribution apertures are arranged in distribution zones across the lower surface of the distribution plate and in which each distribution zone is configured to extrude a polymer stream that is of a different type of polymer than the polymer stream of an adjacent zone.

III. Representative Zoned Distribution Plates

FIGS. 5-11 illustrate partial views of the lower surfaces of zoned distribution plates that are in accordance with various embodiments of the invention. Given the number of distribution apertures typically present on a distribution plate, the number of rows and columns depicted in FIGS. 5-11 is reduced for simplicity, and is not meant to limit the actual number of distribution apertures in any way.

As in the spinneret, the distribution apertures 82 shown in FIGS. 5-11 are arranged in a rectangular array comprising a plurality of rows (designated by reference character "R") extending longitudinally in the cross direction of the spin beam between a proximal end 78a and a distal end 78b of the zoned distribution plate. In some embodiments, the distribution apertures are also arranged as a plurality of columns (designated by reference character "C") extending laterally in the machine direction of the spin beam. Although the zoned distribution plate is not limited to any particular number of distribution apertures, the zoned distribution plate typically includes from about 1,000 to 6,000 distribution apertures per meter.

In some embodiments, the spin beam may include from about 20 to 80 rows of spinneret orifices, and hence 20 to 80 corresponding rows of distribution apertures that extend longitudinally in the cross direction of the spin beam. In certain embodiments of a zoned distribution plate having two distribution zones, the ratio of the number of rows of distribution orifices per zone may range from 8:72 to 72:8. For example, in a zoned distribution plate having two zones and in which each zone has approximately the same number of rows (R), the first distribution zone may include from 10 to 50, such as 20 to 40 rows, and the second distribution zone may also include from 10 to 50, such as from about 20 to 40 rows. In one particular embodiment, the zoned distribution plate comprises a first distribution zone having 25 to 30 rows of distribution apertures extending in the longitudinal direction of the spin beam, and a second distribution zone having 25 to 30 rows of distribution apertures extending in the longitudinal direction.

In one embodiment, the zoned distribution plate comprise a first distribution zone having at least 4 rows, at least 5 rows, at least 6 rows, at least 7 rows, at least 8 rows, at least 9 rows, at least 10 rows, at least 11 rows, at least 12 rows, at least 13 rows, at least 14 rows, at least 15 rows, at least 16 rows, at least 17 rows, at least 18 rows, at least 19 rows, at least 20 rows, at least 21 rows, at least 22 rows, at least 23 rows, at least 24 rows, at least 25 rows, at least 26 rows, at least 27 rows, at least 28 rows, at least 29 rows, at least 30 rows, at least 31 rows, at least 32 rows, at least 33 rows, at least 34 rows, at least 35 rows, at least 36 rows, at least 37 rows, at least 38 rows, at least 39 rows, at least 40 rows, at least 41 rows, at least 42 rows, at least 43 rows, at least 44 rows, at least 45 rows, at least 46 rows, at least 47 rows, at least 48 rows, at least 49 rows, at least 50 rows, at least 51 rows, at least 52 rows, at least 53 rows, at least 54 rows, at least 55 rows, at least 56 rows, at least 57 rows, at least 58 rows, at least 59 rows, at least 60 rows, at least 61 rows, at least 62 rows, at least 63 rows, at least 64 rows, at least 65 rows, at least 66 rows, at least 67 rows, at least 68 rows, at least 69, rows, at least 70 rows, at least 71 rows, at least 72 rows, at least 73 rows, at least 74 rows, at least 75 rows, at least 76 rows, at least 77 rows, at least 78 rows, at least 79 rows, and at least 80 rows of distribution apertures.

In addition, the first distribution zone may include less than 80 rows, less than 79 rows, less than 78 rows, less than 77 rows, less than 76 rows, less than 75 rows, less than 74 rows, less than 73 rows, less than 72 rows, less than 71 rows, less than 70 rows, less than 69 rows, less than 68 rows, less than 67 rows, less than 66 rows, less than 65 rows, less than 64 rows, less than 63 rows, less than 62 rows, less than 61 rows, less than 60 rows, less than 59 rows, less than 58 rows, less than 57 rows, less than 56 rows, less than 55 rows, less than 54 rows, less than 53 rows, less than 52 rows, less than 51 rows, less than 50 rows, less than 49 rows, less than 48 rows, less than 47 rows, less than 46 rows, less than 45 rows, less than 44 rows, less than 43 rows, less than 42 rows, less than 41 rows, less than 40 rows, less than 39 rows, less than 38 rows, less than 37 rows, less than 36 rows, less than 35 rows, less than 34 rows, less than 33 rows, less than 32 rows, less than 31 rows, less than 30 rows, less than 29 rows, less than 28 rows, less than 27 rows, less than 26 rows, less than 25 rows, less than 24 rows, less than 23 rows, less than 22 rows, less than 21 rows, less than 20 rows, less than 19 rows, less than 18 rows, less than 17 rows, less than 16 rows, less than 15 rows, less than 14 rows, less than 13 rows, less than 12 rows, less than 11 rows, less than 10 rows, less than 9 rows, less than 8 rows, less than 7 rows, less than 6 rows, less than 5 rows, less than 4 rows, less than 3 rows, and less than 2 rows of distribution apertures.

In some embodiments, the first distribution zone may include from 2 to 78 rows of distribution apertures, from 3 to 77 rows, from 4 to 76 rows, from 5 to 75 rows, from 6 to 74 rows, from 7 to 73 rows, from 8 to 72 rows, from 9 to 71 rows, from 10 to 70 rows, from 11 to 69 rows, 12 to 68 rows, from 12 to 67 rows, from 13 to 66 rows, from 14 to 65 rows, from 15 to 64 rows, from 16 to 63 rows, from 17 to 62 rows, from 18 to 61 rows, from 19 to 60 rows, from 20 to 59 rows, from 21 to 58 rows, from 22 to 57 rows, from 23 to 56 rows, from 24 to 55 rows, form 23 to 54 rows, from 24 to 53 rows, or from 25 to 52 rows. In certain embodiments, the first distribution zone may include from 20 to 35 rows, from 21 to 34 rows, from 22 to 33 rows, from 23 to 32 rows, from 24 to 31 rows, from 25 from 30 rows, from 26 to 29 rows, or from 27 to 28 rows of distribution apertures.

Similarly, the zoned distribution plate in this embodiment may also comprise a second distribution zone having at least 4 rows, at least 5 rows, at least 6 rows, at least 7 rows, at least 8 rows, at least 9 rows, at least 10 rows, at least 11 rows, at least 12 rows, at least 13 rows, at least 14 rows, at least 15 rows, at least 16 rows, at least 17 rows, at least 18 rows, at least 19 rows, at least 20 rows, at least 21 rows, at least 22 rows, at least 23 rows, at least 24 rows, at least 25 rows, at least 26 rows, at least 27 rows, at least 28 rows, at least 29 rows, at least 30 rows, at least 31 rows, at least 32 rows, at least 33 rows, at least 34 rows, at least 35 rows, at least 36 rows, at least 37 rows, at least 38 rows, at least 39 rows, at least 40 rows, at least 41 rows, at least 42 rows, at least 43 rows, at least 44 rows, at least 45 rows, at least 46 rows, at least 47 rows, at least 48 rows, at least 49 rows, at least 50 rows, at least 51 rows, at least 52 rows, at least 53 rows, at least 54 rows, at least 55 rows, at least 56 rows, at least 57 rows, at least 58 rows, at least 59 rows, at least 60 rows, at least 61 rows, at least 62 rows, at least 63 rows, at least 64 rows, at least 65 rows, at least 66 rows, at least 67 rows, at least 68 rows, at least 69, rows, at least 70 rows, at least 71 rows, at least 72 rows, at least 73 rows, at least 74 rows, at least 75 rows, at least 76 rows, at least 77 rows, at least 78 rows, at least 79 rows, and at least 80 rows of distribution apertures.

In addition, the second distribution zone may include less than 80 rows, less than 79 rows, less than 78 rows, less than 77 rows, less than 76 rows, less than 75 rows, less than 74 rows, less than 73 rows, less than 72 rows, less than 71 rows, less than 70 rows, less than 69 rows, less than 68 rows, less than 67 rows, less than 66 rows, less than 65 rows, less than 64 rows, less than 63 rows, less than 62 rows, less than 61 rows, less than 60 rows, less than 59 rows, less than 58 rows, less than 57 rows, less than 56 rows, less than 55 rows, less than 54 rows, less than 53 rows, less than 52 rows, less than 51 rows, less than 50 rows, less than 49 rows, less than 48 rows, less than 47 rows, less than 46 rows, less than 45 rows, less than 44 rows, less than 43 rows, less than 42 rows, less than 41 rows, less than 40 rows, less than 39 rows, less than 38 rows, less than 37 rows, less than 36 rows, less than 35 rows, less than 34 rows, less than 33 rows, less than 32 rows, less than 31 rows, less than 30 rows, less than 29 rows, less than 28 rows, less than 27 rows, less than 26 rows, less than 25 rows, less than 24 rows, less than 23 rows, less than 22 rows, less than 21 rows, less than 20 rows, less than 19 rows, less than 18 rows, less than 17 rows, less than 16 rows, less than 15 rows, less than 14 rows, less than 13 rows, less than 12 rows, less than 11 rows, less than 10 rows, less than 9 rows, less than 8 rows, less than 7 rows, less than 6 rows, less than 5 rows, less than 4 rows, less than 3 rows, and less than 2 rows of distribution apertures.

In some embodiments, the second distribution zone may include from 2 to 78 rows of distribution apertures, from 3 to 77 rows, from 4 to 76 rows, from 5 to 75 rows, from 6 to 74 rows, from 7 to 73 rows, from 8 to 72 rows, from 9 to 71 rows, from 10 to 70 rows, from 11 to 69 rows, 12 to 68 rows, from 12 to 67 rows, from 13 to 66 rows, from 14 to 65 rows, from 15 to 64 rows, from 16 to 63 rows, from 17 to 62 rows, from 18 to 61 rows, from 19 to 60 rows, from 20 to 59 rows, from 21 to 58 rows, from 22 to 57 rows, from 23 to 56 rows, from 24 to 55 rows, form 23 to 54 rows, from 24 to 53 rows, or from 25 to 52 rows. In certain embodiments, the second distribution zone may include from 20 to 35 rows, from 21 to 34 rows, from 22 to 33 rows, from 23 to 32 rows, from 24 to 31 rows, from 25 from 30 rows, from 26 to 29 rows, or from 27 to 28 rows of distribution apertures.

Figure 5:
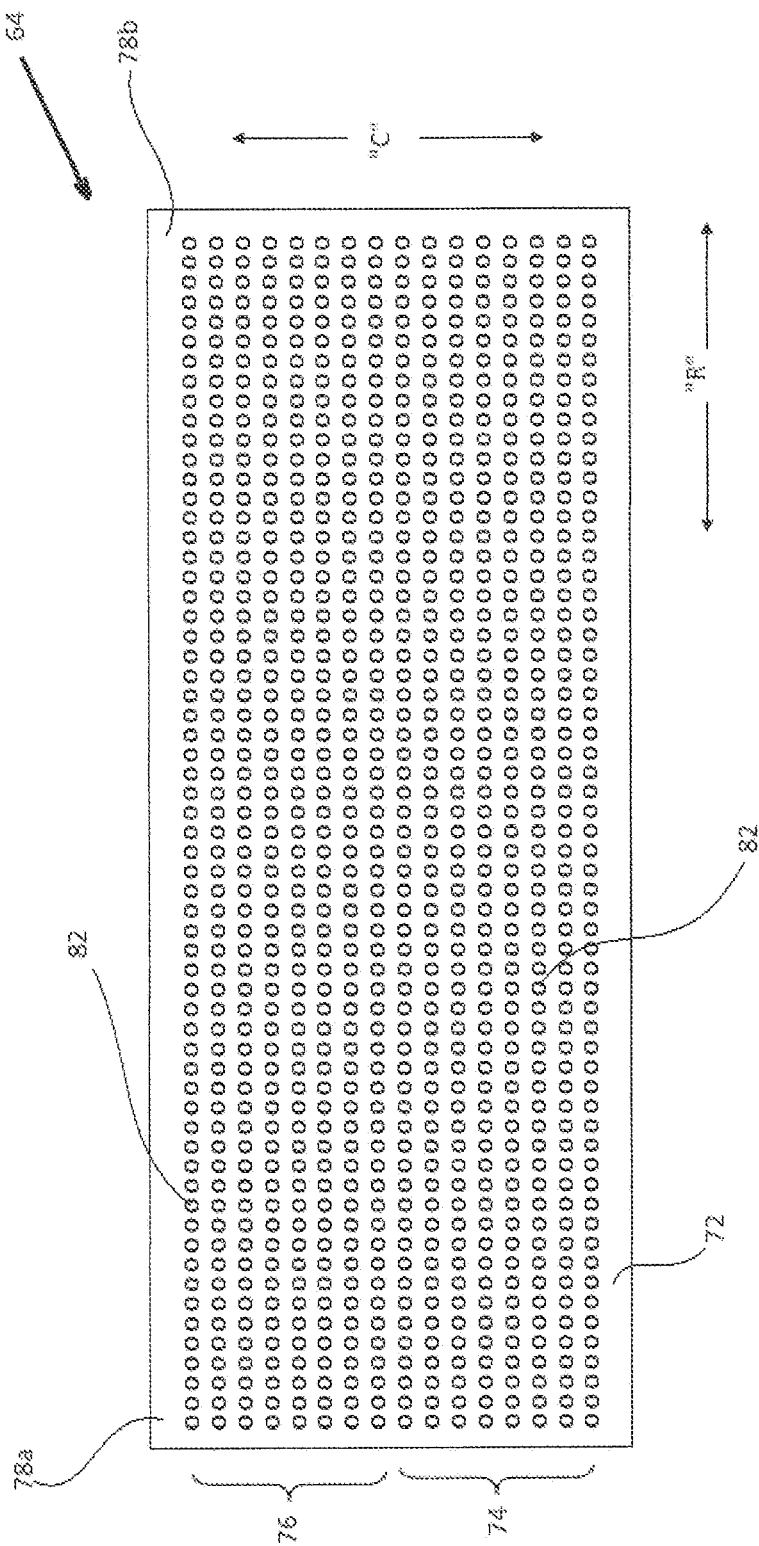
FIGS. 5-11 illustrate various zoned distribution plates in accordance with embodiments of the invention.

FIG. 5 illustrates the lower surface 72 of zoned distribution plate 64. In this embodiment, the zoned distribution plate 64 includes a first distribution zone 74 and a second distribution zone 76. In this illustrated embodiment, the first and second distribution zones extend longitudinally in the cross direction of the spin beam. In certain embodiments, a first polymer melt stream is distributed by the zoned distribution plate 64 to the first distribution zone 74, and a second polymer melt stream of a different type is distributed by the zoned distribution plate 64 to the second distribution zone 76.

The number of rows (R) per distribution zone may vary depending on the desired properties of the single fabric layer. Typically, the number of rows (R) of distribution apertures in the first distribution zone may range from about 20 to 80% based on the total number or rows of distribution apertures on the zoned distribution plate, and the number of rows (R) of distribution apertures in the second distribution zone may range from about 20 to 80% based on the total number or rows of distribution apertures on the zoned distribution plate. That is, the ratio of rows in the first distribution zone to the number of rows in the second distribution zone may be from about 20:80 to 80:20, with a ratio of 30:70 to 30:70 being somewhat preferred. In some embodiments, the ratio of rows in the first distribution zone to the number of rows in the second distribution zone may be about 50:50.

Figure 6:
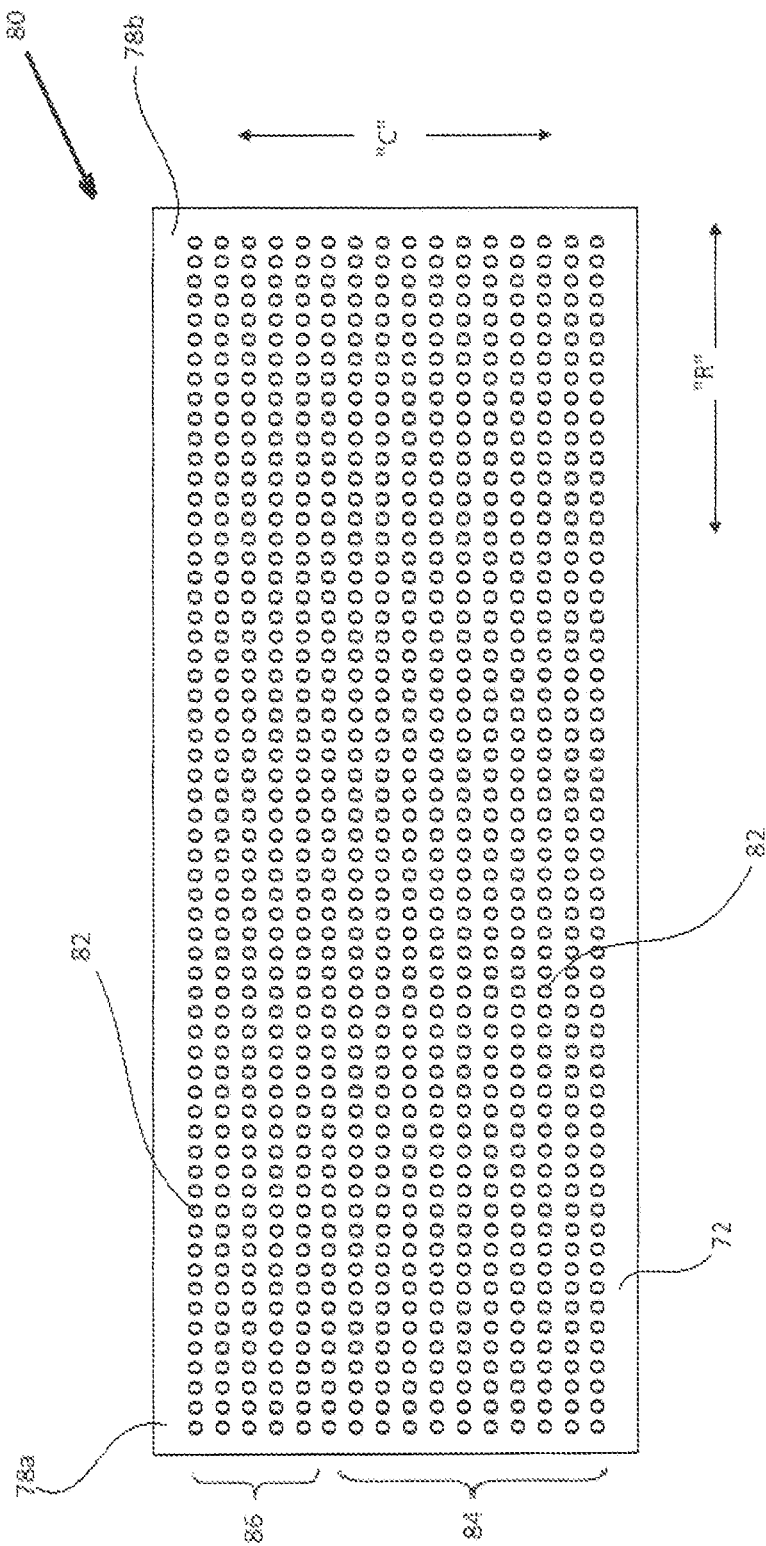

The embodiment illustrated in FIG. 6 comprises a zoned distribution plate 80 having a first distribution zone 84 and a second distribution zone 86. In this illustrated embodiment, the first and second distribution zones extend longitudinally in the cross direction of the spin beam. In certain embodiments, a first polymer melt stream is distributed by the zoned distribution plate 80 to the first distribution zone 84, and a second polymer melt stream of a different type is distributed by the zoned distribution plate 80 to the second distribution zone 86.

The number of rows (R) per distribution zone may vary depending on the desired properties of the single fabric layer. Typically, the number of rows (R) of distribution apertures in the first distribution zone may range from about 10 to 90% based on the total number or rows of distribution apertures on the zoned distribution plate, and the number of rows (R) of distribution apertures in the second distribution zone may range from about 10 to 90% based on the total number or rows of distribution apertures on the zoned distribution plate. That is, the ratio of rows in the first distribution zone to the number of rows in the second distribution zone may be from about 10:90 to 90:10, with a ratio of 20:80 to 80:20 being somewhat preferred. In some embodiments, the ratio of rows in the first distribution zone to the number of rows in the second distribution zone may be from about 30:70.

In one embodiment, the zoned distribution plate 80 comprises a first distribution zone 84 configured to extrude monocomponent filaments comprising one of polymer A, polymer B, a blend of polymers A and B, or a third polymer C that is different from polymers A and B, and a second distribution zone 86 configured to extrude multicomponent filaments comprising a first polymer component (polymer A) and a second polymer component (polymer B).

In a preferred embodiment, the ratio of first distribution zone 84 to the second distribution zone 86 is from 15:85 to 30.70, and the first distribution zone is configured to extrude monocomponent fibers comprising a first polymer A, and the second distribution zone is configured to extrude bicomponent fibers having a side-by-side configuration, eccentric configuration or a D-centric configuration, and in which one of the polymer components comprises polymer A and the second polymer component comprises a second polymer B. In a preferred embodiment, the second distribution zone is configured to extrude bicomponent fibers having a side-by-side configuration.

In a further embodiment of the zoned distribution plate of FIG. 6, the first and second distribution zones may be configured to extrude polymer streams that are substantially the same except for a change in composition, structure, or cross section. For example, in one embodiment first and second distribution zones 84, 86 may be configured to extrude polymer streams comprising the same polymer (e.g., polymer A), however, one of the polymer streams to be extruded by either the first or second distribution zones may include a functional additive that is blended with the polymer to impart a desired property to one of the regions of the resulting single fabric layer. In some embodiments, a stratified fabric layer is provided in which a functional additive is provided in one or more desired regions of the single fabric layer. In this way, it is possible to produce a nonwoven fabric having a desired functionality at a targeted region within a single layer of the nonwoven fabric.

Examples of representative nonwoven fabric layers having a stratified fabric layer that may be prepared with a zoned distribution plate in accordance with FIG. 5 are discussed in greater detail below.

Figure 7:
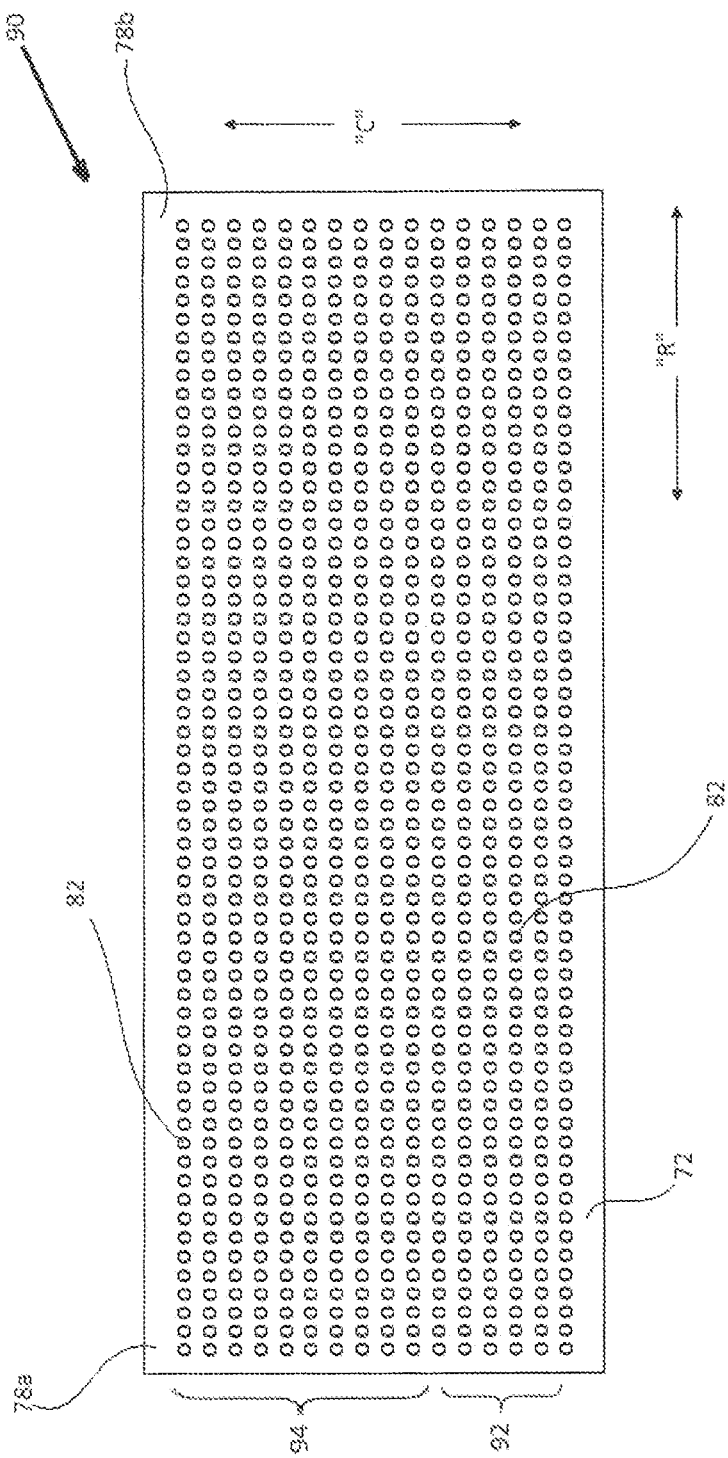

FIG. 7 illustrates a further example of a zoned distribution plate 90 that may be used in accordance with embodiments of the present invention. In this embodiment, the zoned distribution plate 90 comprises a first distribution zone 92 configured to extrude bicomponent filaments having a side-by-side configuration, and a second distribution zone 94 configured to extrude bicomponent filaments having an eccentric sheath/core or D-centric sheath/core configuration. Advantageously, each of the first distribution zone 92 and the second distribution zone 94 may be configured to produce crimped filaments in which the type of crimping is different. For example, one zone may produce helical crimp whereas the other zone may produce a crimp having a sinusoidal shape.

As in the embodiment illustrated in FIG. 6, the number of rows (R) per distribution zone may vary depending on the desired properties of the single fabric layer. Typically, the number of rows (R) of distribution apertures in the first distribution zone 92 may range from about 10 to 90% based on the total number or rows of distribution apertures on the zoned distribution plate, and the number of rows (R) of distribution apertures in the second distribution zone 94 may range from about 10 to 90% based on the total number or rows of distribution apertures on the zoned distribution plate. That is, the ratio of rows in the first distribution zone to the number of rows in the second distribution zone may be from about 10:90 to 90:10, with a ratio of 20:80 to 80:20 being somewhat preferred. In some embodiments, the ratio of rows in the first distribution zone to the number of rows in the second distribution zone may be about 50:50.

In a preferred embodiment, the ratio of first distribution zone to the second distribution zone is from 15:85 to 30:70.

In certain embodiments, the first distribution zone 92 of the zoned distribution plate depicted in FIG. 7 is configured to extrude bicomponent fibers having an eccentric or D-centric sheath/core configuration in which one of the polymer components is one of polymer A and the other component is one of polymers B or C, and the second distribution zone 94 is configured to extrude bicomponent fibers having a side-by-side configuration in which one of the polymer components is polymer A and the other polymer component is polymer B.

Examples of representative nonwoven fabric layers having a stratified fabric layer that may be prepared with a zoned distribution plate in accordance with FIG. 7 are discussed in greater detail below.

Figure 8:
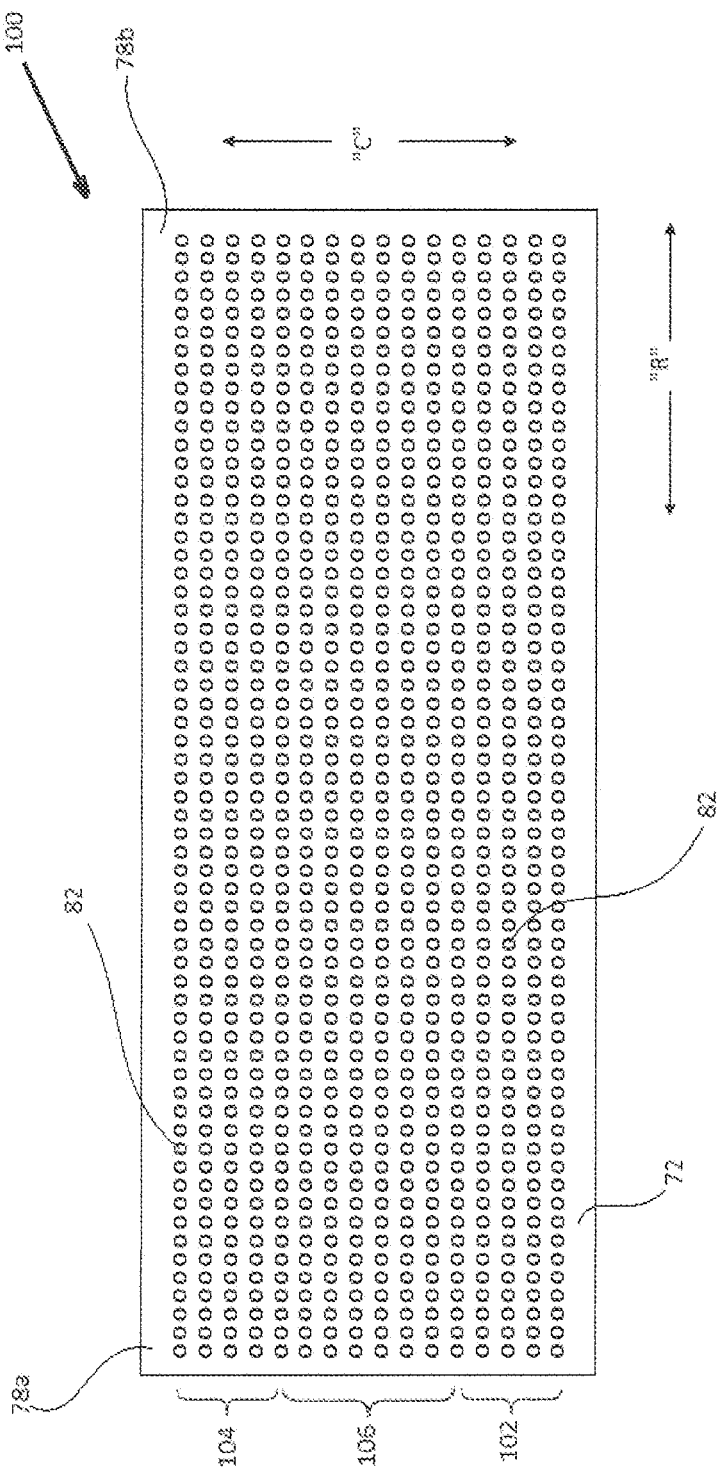

FIG. 8 illustrates another example of a zoned distribution plate 100 that may be used in accordance with embodiments of the present invention. In this embodiment, the zoned distribution plate 100 comprises a first distribution zone 102, a second distribution zone 104, and a third distribution zone 106 that is sandwiched between first and second distribution zones 102, 104. Each of the distribution zones extend longitudinally in the cross direction of the spin beam. In certain embodiments of this zoned distribution plate, the first and second distribution zones 102, 104 are configured to form the outer exterior regions of a stratified nonwoven fabric and the third distribution zone 106 is configured to form an interior region of the stratified nonwoven fabric.

In certain embodiments of the zoned distribution plate shown in FIG. 8, the first and second distribution zones 102, 104 may be configured to extrude polymer streams that are of the same type, or alternatively, to each extrude a polymer stream that is different from each other. In some embodiments, the first and second distribution zones 102, 104 may be configured to extrude polymer streams that form homopolymer fibers.

In certain embodiments, third distribution zone 106 is configured to extrude polymer streams having a multicomponent configuration in which at least two polymer components form the resulting multicomponent fibers. The resulting multicomponent fibers may have a side-by-side configuration, sheath/core configuration, eccentric sheath/core configuration, D-centric sheath/core configuration, tricomponent configuration, or a bico-segmented pie configuration.

As in the previously discussed embodiments, the number of rows (R) per distribution zone may vary depending on the desired properties of the single fabric layer. Typically, the number of rows (R) of distribution apertures in each of the first and second distribution zones 102, 104 may range from about 10 to 40% based on the total number or rows of distribution apertures on the zoned distribution plate, and the number of rows (R) of distribution apertures in the third distribution zone may range from about 20 to 80% based on the total number or rows of distribution apertures on the zoned distribution plate. In a preferred embodiment, the ratio of the combined number of rows (R) of the first and second distribution zones to the number of rows (R) of the third distribution zones is from about 20:80 to 80:20, and more preferably, from about 40:60 to about 60:40. In certain embodiments, the ratio is from about 45:55 to about 55:45, with a ratio of about 50:50 being somewhat preferred.

In certain embodiments, first and second distribution zones 102, 104 may be configured to extrude monocomponent fibers, and the third distribution zone 106 may be configured to extrude bicomponent fibers having a side-by-side configuration, eccentric sheath core configuration, or a D-centric sheath/core configuration. In such an embodiment, the bicomponent polymer stream of the third distribution zone may comprise polymer A and polymer B, and the polymer stream of the first and second distribution zones may comprise one or more of a polymer A, polymer B, or polymer C, and blends thereof.

Examples of representative nonwoven fabric layers having a stratified fabric layer that may be prepared with a zoned distribution plate in accordance with FIG. 8 are discussed in greater detail below.

Figure 9:
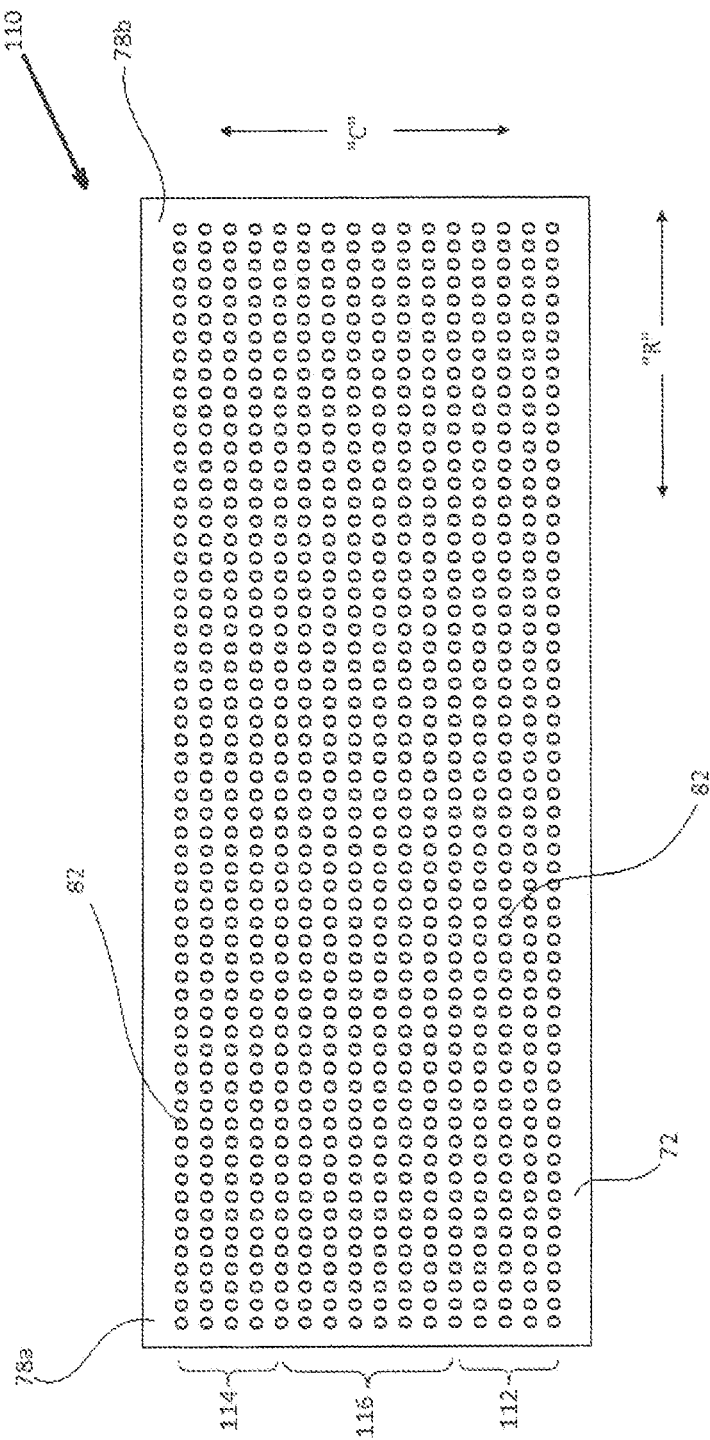

FIG. 9 illustrates another example of a zoned distribution plate 110 that may be used in accordance with embodiments of the present invention. In this embodiment, the zoned distribution plate 110 comprises a first distribution zone 112, a second distribution zone 114, and a third distribution zone 116 that is sandwiched between first and second distribution zones 112, 114. In certain embodiments, the first and second distribution zones 112, 114 may be configured to form outer exterior regions of a stratified nonwoven fabric and the third distribution zone 116 is configured to form an interior region of the stratified nonwoven fabric.

In certain embodiments, the first and second distribution zones 112, 114 may be configured to extrude multicomponent polymer streams in which the resulting multicomponent fibers may have a side-by-side configuration, sheath/core configuration, eccentric sheath/core configuration, D-centric sheath/core configuration, tricomponent configuration, or a bico-segmented pie configuration. In such an embodiment, the third distribution zone 116 may be configured to extrude multicomponent polymer streams in which the resulting multicomponent fibers may have a side-by-side configuration.

In a preferred embodiment, the first and second distribution zones 112, 114 are configured to extrude bicomponent polymer streams having a 4-part segmented pie configuration in which a polymer A and polymer B each comprise two alternating segments of the stream, and in which the third distribution zone is configured to extruded bicomponent fibers having a side-by-side configuration in which the two components are different from each other and may be one of polymer A, polymer B, or polymer C.

As in the previously discussed embodiments, the number of rows (R) per distribution zone may vary depending on the desired properties of the single fabric layer. Typically, the number of rows (R) of distribution apertures in each of the first and second distribution zones 112, 114 may range from about 10 to 20% based on the total number or rows of distribution apertures on the zoned distribution plate, and the number of rows (R) of distribution apertures in the third distribution zone may range from about 60 to 80% based on the total number or rows of distribution apertures on the zoned distribution plate. In a preferred embodiment, the ratio of the combined number of rows (R) of the first and second distribution zones to the number of rows (R) of the third distribution zones is from about 20:80 to 40:60, and more preferably, from about 22:78 to about 24:76, with a ratio of about 28:72 being somewhat preferred.

Examples of representative nonwoven fabric layers having a stratified fabric layer that may be prepared with a zoned distribution plate in accordance with FIG. 9 are discussed in greater detail below.

Figure 10:
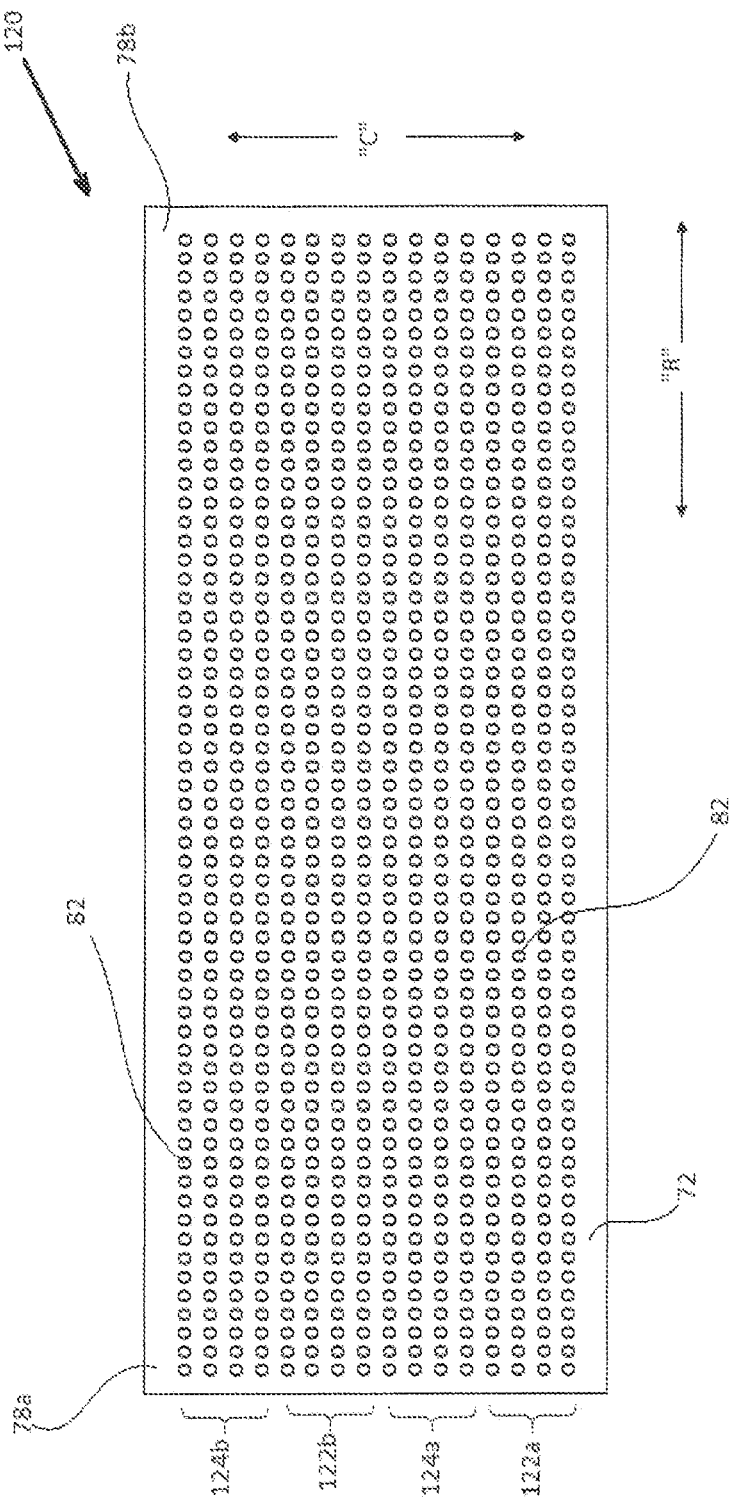

FIG. 10 illustrates another example of a zoned distribution plate 120 that may be used in accordance with embodiments of the present invention. In this embodiment, the zoned distribution plate 120 comprises a plurality of series of distribution zones in which adjacent distribution zones are configured to extrude polymer streams of a different type from each other, and alternating pairs of distribution zones are configured to extrude polymer streams of the same type of polymer. For example, distribution zones 122*a* and 122*b* are configured to extrude polymer streams in which the polymers are of the same type (i.e., identical structure and composition), and distribution zones 124*a* and 124*b* are also configured to extrude polymer streams in which the polymers are of the same type (i.e., identical structure and composition).

In the embodiment shown in FIG. 10, a total of 4 distribution zones are illustrated; however, it should be recognized that the zoned distribution plate may include any number of alternating distribution zones, such as from about 2 to 40, 5 to 30, or 10 to 20, for example.

The alternating distribution zones may be configured to extrude monocomponent or multicomponent filaments.

As in the previously discussed embodiments, the number of rows (R) per distribution zone may vary depending on the desired properties of the stratified fabric layer. Typically, the number of rows (R) of distribution apertures in each may range from about 10 to 30% based on the total number of rows of distribution apertures on the zoned distribution plate, and in particular, from about 15 to 25% based on the total number or rows of distribution apertures on the zoned distribution plate. It should be recognized that the percentage of rows in each of the distribution zones do not have to be the same and can be varied depending on the desired properties of the resulting stratified fabric layer.

Figure 11:
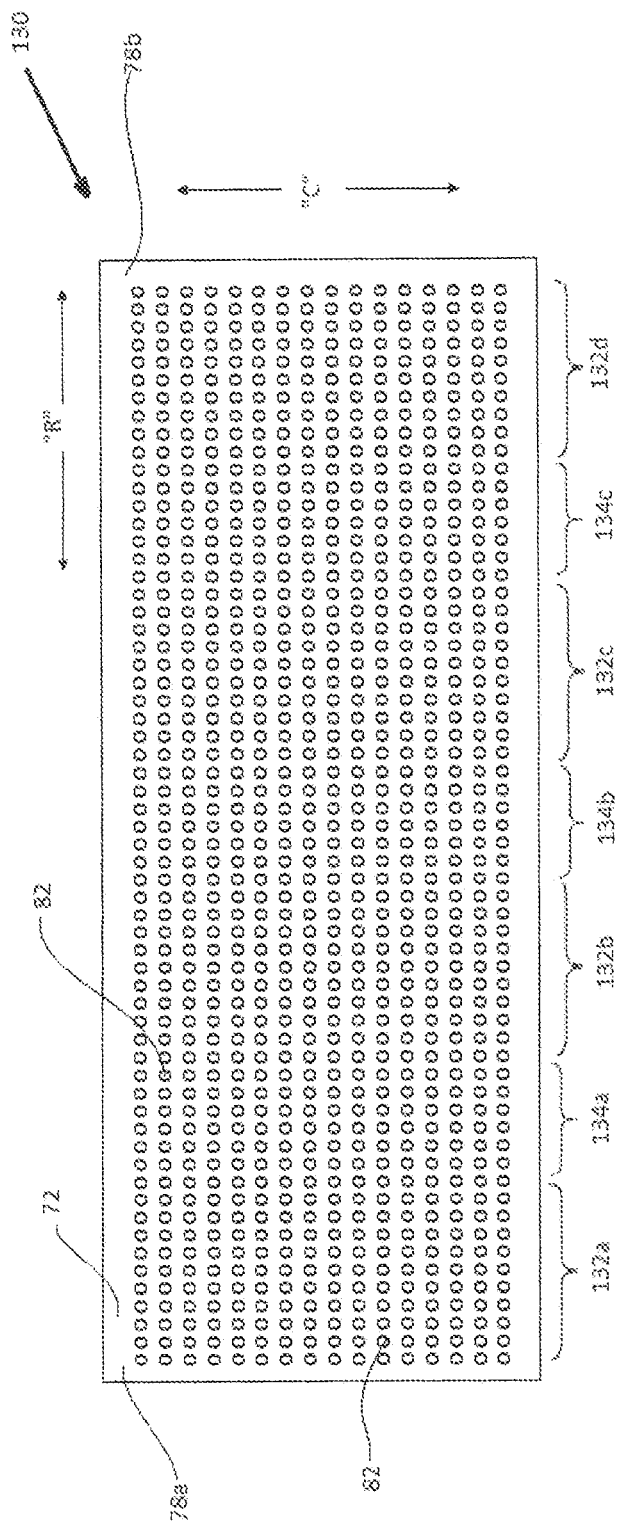

FIG. 11 illustrates another example of a zoned distribution plate 130 that may be used in accordance with embodiments of the present invention. In this embodiment, the distribution zones (e.g., 132a, 134a, 132b, 134b, . . . ) extend in the machine direction of the zoned distribution plate 130. As in the distribution plate of FIG. 10, zoned distribution plate 130 comprises a plurality of distribution zones in which adjacent distribution zones are configured to extrude polymer streams of a different type from each other, and alternating distribution zones are configured to extrude polymer streams of the same type of polymer. For example, distribution zones 132a, 132b, 132c, and 132d are configured to extrude polymer streams in which the polymers are of the same type (i.e., identical structure and composition), and in which the polymer streams are of a different type than that extruded by distribution zones 134a 134b, and 134c. Similarly, distribution zones 134a 134b, and 134c are also configured to extrude polymer streams in which the polymers are of the same type (i.e., identical structure and composition), and in which the polymer streams are of a different type than that extruded by distribution zones 132a, 132b, 132c, and 132d.

In one embodiment of the zoned distribution plate 130, the first series of alternating distribution zones (e.g., 132a, 134a, 132b, 134b) are configured to extrude polymer streams having a bicomponent configuration, such as side-by-side, eccentric sheath/core, D-centric sheath/core, and the like, and in which polymers A and B comprise the two polymer components. In this embodiment, the second series of alternating distribution zones (e.g., 134a 134b, and 134c) are configured to extrude polymer streams having a monocomponent configuration comprising one of polymers A, B, or C.

In one embodiment, the first series of alternating distribution zones (e.g., 132a, 134a, 132b, 134b) comprise about 60 to 85% of the number of columns (C) of the distribution apertures, based on the total number of columns of distribution apertures on the zoned distribution plate, and in particular, from about 70 to 80% based on the total number of columns of distribution apertures on the zoned distribution plate. In one embodiment, the ratio of the first series of alternating distribution zones to the second series of alternating distribution zones is from about 80:20 to 70:30, with a ratio of 75:25 being somewhat preferred. It should be recognized that the percentage of columns in each of the distribution zones do not have to be the same and can be varied depending on the desired properties of the resulting stratified fabric layer.

IV. Representative Examples of Stratified Fabric Layer

FIG. 1 and FIGS. 12-17 illustrate representative nonwoven fabrics having a stratified fabric layer that are in accordance with various embodiments of the invention. It should be recognized that the representative examples are provided to show various embodiments that may be prepared in accordance with embodiments of the invention and are not intended to limit the invention in any way. In particular, it should be understood that a wide variety of nonwoven fabrics having a stratified fabric layer are encompassed within the scope of the present invention.

Embodiments of the invention are particularly useful for preparing a spunbond nonwoven fabric comprising crimped fibers.

Crimped fibers may be particularly useful in hygiene applications because of their tendency to improve the loft and softness of the fabric. However, crimp fabrics have drawbacks as they typically have less mechanical strength and dimensional stability. As a consequence, crimped fabrics tend to have significant neck-in, which in essence results in shrinkage of the fabric in the cross direction of the fabric under MD stress. To address this problem, U.S. Patent Publication No. 2016/0221300 (hereinafter "the '300 publication") describes a composite laminate in which a crimped spunbond fabric is deposited overlying a non-crimped spunbond fabric. The noncrimped spunbond fabric provides dimensional stability to the crimped spunbond fabric. However, the system and method described in the '300 publication has drawbacks. In particular, it requires at least two separate spunbond fabric layers, which in turn requires two separate spinning beams and the associated equipment with each spinning beam. This increases the complexity and cost of preparing the composite laminate described in the '300 publication.

Advantageously, the inventors have discovered that the use of single fabric layer having two different fiber types provides a crimped fabric having improved dimensional stability without the need for multiple spunbond spinning beams.

Referring back to FIG. 1, nonwoven fabric 2 comprises a single fabric layer 4 having two different fiber types 6, 8 in which the first fiber comprises a monocomponent filament that is non-crimping or low crimping, and the second fiber 8 comprises a crimped bicomponent fiber of a different fiber type than the first fiber. As discussed above, the single fabric layer 4 is extruded from the spin beam as a single layer.

In one embodiment, second fibers 8 comprising crimped continuous filaments comprises bicomponent fibers in which one of polymer components is different than the other polymer component (e.g., differences in crystallinity, melting temperature, polydispersity index, flexural modulus, heat of fusion, and/or melt flow rate (MFR)) so that the bicomponent fibers advantageously develop spontaneous or possess natural crimp. In certain embodiments, the crimped continuous filaments have a bicomponent configuration selected from the group consisting of side-by-side, eccentric sheath/core, D-centric sheath/core, or any other configuration capable of developing or possessing crimp. The crimped continuous filaments of the second fibers provide improved loft and softness. Polymers for preparing crimped fibers are discussed previously.

In a preferred embodiment, the crimped second fibers have a helical crimp comprising a plurality of loops along the length of the filaments. Typically, the number of helical loops per cm may range from about 2 to 100, and in particular, from about 5 to 75. In a preferred embodiment, the crimped fibers have at least 10 helical loops per cm, and more particularly, at least about 15 helical loops per cm. In a preferred embodiment, the number of crimps per cm is from about 2 to 20 helical loops. The number of crimps of the crimped fibers according to the present invention may be determined in accordance with JIS L 1015.

The first fibers 6 are non-crimping or low-crimping filaments and comprise monocomponent fibers or multicomponent fibers that typically do not develop helical crimp, such as a centric sheath/core configuration. The first fibers provide strength and improved dimensional stability to the nonwoven fabric.

In some embodiments, the first fibers 6 may comprise polyolefins, such as polyethylene, polypropylene, and combinations thereof. In a preferred embodiment, the first fibers 6 comprise a Ziegler-Natta catalyzed homopolymer polypropylene having an MFR from about 20 to 40 g/10 min., and in particular an MFR of about 25 to 35 g/10 min.

Figure 12:
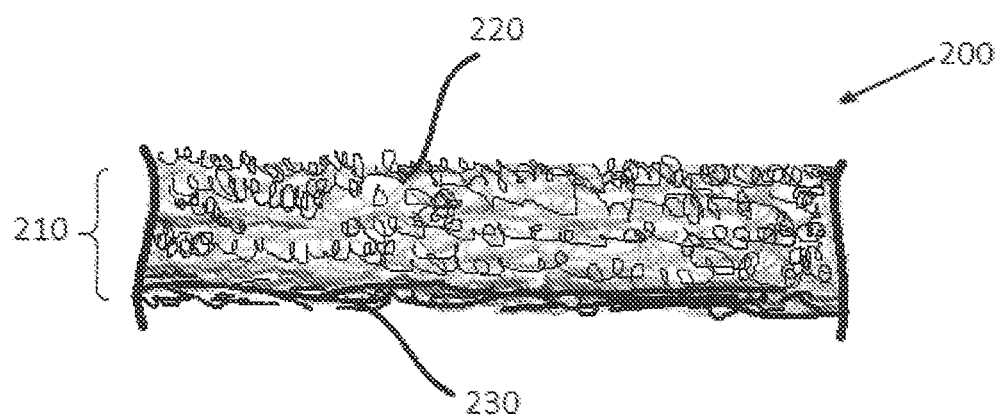
FIGS. 12-17 are cross sectional views of nonwoven fabrics in which each fabric have a stratified fabric layer in accordance with at least one embodiment of the invention.

Further embodiments provide a nonwoven fabric having a stratified fabric layer comprising crimped filaments. In this regard, FIG. 12 illustrates an embodiment of a nonwoven fabric 200 having a stratified fabric layer 210 having a first region 220 comprising crimped continuous filaments and a second region 230 of non-crimping or low-crimping filaments. In certain embodiments, the stratified fabric layer depicted in FIG. 12 can be prepared using the zoned distribution plate depicted in FIG. 5 or 6, which are discussed previously. As shown, the first and second regions 220, 230 extend in the cross-direction of the nonwoven fabric such that one of the regions overlies the other region. Low crimping or non-crimping fibers typically have less than 2 loops per cm of fiber length.

As discussed above, the stratified fabric layer 210 is extruded from the spin beam as a single layer.

In one embodiment, the first region 220 comprising crimped continuous filaments comprises bicomponent fibers in which one of polymer components is different than the other polymer component (e.g., differences in crystallinity, molecular weight, melting temperature, polydispersity index, flexural modulus, heat of fusion, melt flow rate (MFR), and crimp inducing polymer additives, such as blends with meltblown resins and/or polymers having low isotacticity) so that the bicomponent fibers advantageously develop spontaneous or possess natural crimp. In certain embodiments, the crimped continuous filaments have a bicomponent configuration selected from the group consisting of side-by-side, eccentric sheath/core, D-centric sheath/core, or any other configuration capable of developing or possessing crimp. The crimped continuous filaments of the first region 220 provide improved loft and softness.

In a preferred embodiment, the crimped continuous filaments of the first region have a helical crimp comprising a plurality of loops along the length of the filaments. Typically, the number of helical loops per cm may range from about 2 to 100, and in particular, from about 5 to 75. In a preferred embodiment, the crimped continuous filaments have at least 10 helical loops per cm, and more particularly, at least about 15 helical loops per cm. In a preferred embodiment, the number of crimps per cm is from about 2 to 20 helical loops.

A wide variety of different polymers may be used in the production of the crimped continuous filaments. In particular, the bicomponent fibers may comprise polyolefins, such as polypropylenes, polyethylenes, and combinations thereof.

In certain embodiments, the crimped continuous filaments comprise a side-by-side configuration in which a first polymer component of the bicomponent fibers comprises a metallocene catalyzed polypropylene having an MFR from 19 to 40 g/min, and the second polymer component comprises a Ziegler-Natta catalyzed polypropylene having an MFR from about 20 to 35 g/10 min. Unless otherwise stated, MFR is measured in accordance with ISO 1133, 230° C./2.16 kg force.

Additional polymer compositions that may be used to prepare crimped continuous filaments for use in certain embodiments of the invention are discussed in U.S. Patent Publication No. 2016/0221300, U.S. Pat. No. 6,454,989, European Patent No. 2 343 406 B1 and European Patent Application Nos. 3 121 314 and 3 246 443 the contents of all which are hereby incorporated by reference.

The ratio of the first polymer component to the second polymer component may range from about 55:45 to 80:20, with a ratio of 70:30 being somewhat preferred.

In addition to the aforementioned polymer compositions, blends of various polymer and polymer additives may be used to produce crimped filaments. In one such embodiment, a polypropylene having an MFR between 15 to 50 g/10 may be blended with a high MFR polypropylene resin (e.g., from about 500 to 2,000 g/10 min), or a low isotacticty polypropylene.

In one embodiment, the second region 230 of non-crimping or low-crimping filaments comprises monocomponent fibers or multicomponent fibers that typically do not develop helical crimp, such as a centric sheath/core configuration. The filaments of the second region 230 provide strength and improved dimensional stability to the nonwoven fabric.

The filaments comprising the second region 230 may comprise polyolefins, such as polyethylene, polypropylene, and combinations thereof. In a preferred embodiment, the filaments of the second region 230 comprises a Ziegler-Natta catalyzed homoplymer polypropylene having an MFR from about 20 to 40 g/10 min., and in particular an MFR of about 25 to 35 g/10 min. In one embodiment, the polymer comprising the filaments of the second region 230 is the same Ziegler-Natta catalyzed polypropylene used as a second polymer component in the bicomponent filaments of the first region 220.

In certain embodiments, the nonwoven fabric 200 may have a basis weight ranging from about 8 to 65 grams per square meter (gsm), and in particular, from about 10 to 40 gsm. In a preferred embodiment, the nonwoven fabric 200 has a basis weight of about 15 to 30 gsm.

The ratio of the first region 220 to the second region 230 (based on the number of rows of distribution apertures) is from about 40:60 to 90:10, with a ratio of 30:70 being somewhat preferred.

Figure 13:
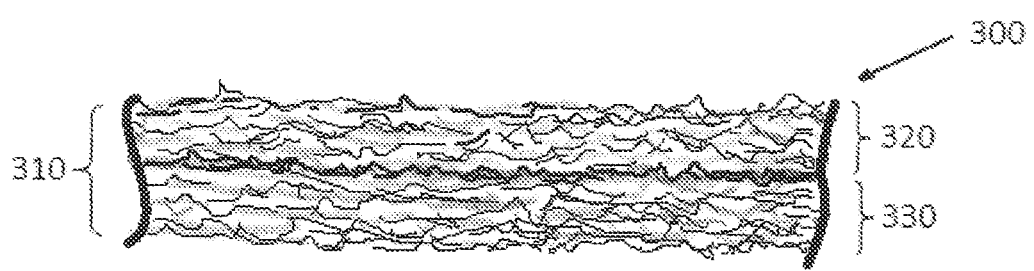

Turning now to FIG. 13, a further embodiment of a nonwoven fabric having a stratified fabric layer that can be made in accordance with embodiments of the invention is illustrated. As shown, nonwoven fabric 300 comprises a stratified fabric layer 310 having a first region 320 and a second region 330 in which the fibers of the two regions are of a different type of each other. As discussed previously, stratified fabric layer 310 is extruded from the spin beam as a single layer. In certain embodiments, the stratified fabric layer depicted in FIG. 13 can be prepared using the zoned distribution plate depicted in FIG. 5, 6, or 7, which are discussed previously.

In one particular embodiment, one of the first or second regions 320, 320 includes a functional additive that is not present in the other region. In this way, a nonwoven fabric may be prepared in which the stratified fabric layer includes a targeted functionality that is not present in the other region. As discussed previously, functional additives that may be included in one or more of the regions includes one or more of colorants, such as pigments, UV stabilizers, hydrophobic agents, hydrophilic agents, antistatic agent, elastomers, compatibilizers antioxidants, anti-block agent, slip agent, optical brighteners, flame retardants, antimicrobials, such as copper oxide and zinc oxide and the like.

In addition to pigments, the first and second regions may comprise different polymers and polymeric blends to impart a desired functionality to one region of the nonwoven fabric 300.

In certain embodiments, the nonwoven fabric 300 may have a basis weight ranging from about 8 to 65 grams per square meter (gsm), and in particular, from about 10 to 40 gsm. In a preferred embodiment, the nonwoven fabric 300 has a basis weight of about 15 to 30 gsm.

Figure 14:
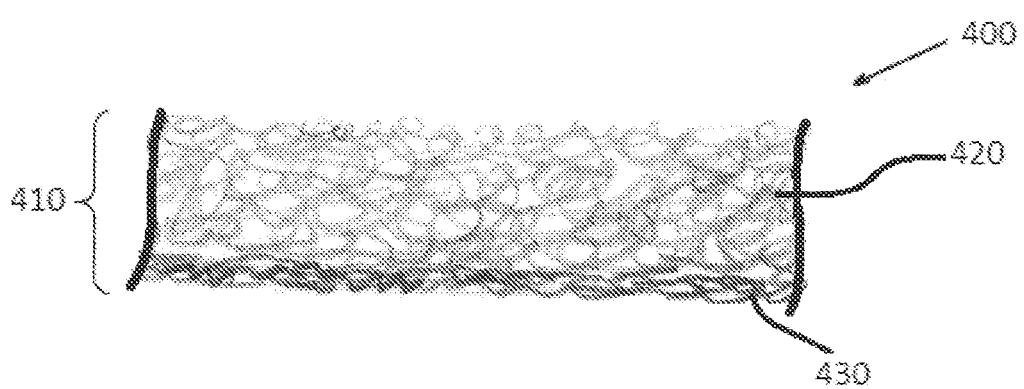

With reference to FIG. 14, another embodiment of a nonwoven fabric 400 having a stratified fabric layer 410 is illustrated. Nonwoven fabric 400 includes stratified fabric layer 410 having a first region 420 and a second region 430 in which the fibers of the two regions are of a different type from each other. The nonwoven fabric 400 of FIG. 14 may be prepared using a zoned distribution plate in accordance with the embodiment shown in FIG. 7 and specifically discussed above.

In one particular embodiment, the first region comprises crimped continuous filaments having a bicomponent configuration, and the second region comprises non-crimping or low crimping filaments having a bicomponent sheath/core configuration. As will be appreciated, this embodiment is similar to the nonwoven fabric illustrated in FIG. 12 in that the first regions of both stratified fabric layer comprised crimped continuous filaments that provide loft and softness to the nonwoven fabric.

The first region 420 of stratified fabric layer 410 may comprise the same materials, structure, and configuration, as the first region 220 of nonwoven fabric 200, which is discussed previously. In a preferred embodiment, the crimped continuous filaments of first region 420 comprises bicomponent filaments having a side-by-side configuration in which a first polymer component of the bicomponent fibers comprises a metallocene catalyzed polypropylene having an MFR from 19 to 40 g/min, and the other second polymer component comprises a Ziegler-Natta catalyzed polypropylene having an MFR from about 20 to 35 g/10 min.

With respect to the second region 430 of the stratified fabric layer 410, in this embodiment, the fibers may comprise bicomponent filaments having a sheath core configuration in which the sheath comprises a metallocene polypropylene having an MFR from about 15 to 40 g/10 min, and in particular, about 20 to 35 g/10 min, and the core comprises a Ziegler-Natta catalyzed polypropylene having an MFR from about 20 to 35 g/10 min. In this embodiment, the bicomponent fibers having a sheath/core configuration may help provide improvement is mechanical properties, such as CD and MD tensile strengths, as well as improvements in CD and MD elongations.

In certain embodiments, the ratio sheath to core in the bicomponent filaments of second region 430 may be from about 90:10 to 10:90, with a ratio of 30:70 being preferred.

In yet a further embodiment of the stratified fabric layer 410, the second region 430 may comprise continuous filaments having a sheath/core configuration in which the sheath comprises a polyethylene polymer and the core comprises a polypropylene polymer, such as one of the previously discussed metallocene or Ziegler-Natta catalyzed polypropylenes. The second region 430 comprising bicomponent filaments having a polyethylene sheath may provide a region of the nonwoven fabric having improved softness and drapeability while also improving flexibility of the nonwoven fabric 400.

In certain embodiments, the nonwoven fabric 400 may have a basis weight ranging from about 8 to 65 grams per square meter (gsm), and in particular, from about 10 to 40 gsm. In a preferred embodiment, the nonwoven fabric 400 has a basis weight of about 15 to 30 gsm.

Figure 15:
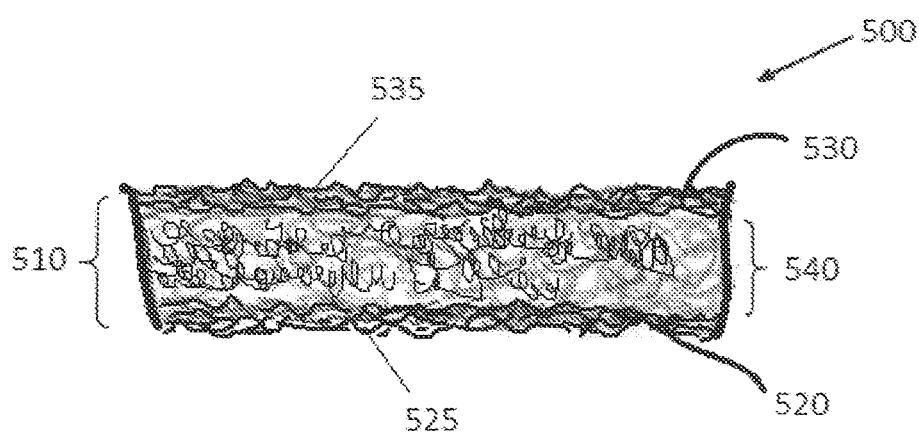

With reference to FIG. 15, another embodiment of a nonwoven fabric having a stratified fabric layer is illustrated. In this embodiment, nonwoven fabric 500 includes a stratified fabric layer 510 having a first region 520, a second region 530, and a third region 540 sandwiched therebetween. In one embodiment, first and second regions 520, 530 are of the same fiber type, and the third region 540 is of a different fiber type in comparison to first region 520 and second region 530. In some embodiments, first region 520 and second region 530 may also be of different fiber types. In certain embodiments, first region 520 comprises first exterior surface 525 and second region 530 comprises second exterior surface 535.

As in the previous discussed embodiments of the stratified fabric layer, nonwoven fabric 500 having stratified fabric layer 510 is produced from a single spin beam. The nonwoven fabric 500 of FIG. 15 may be prepared using a zoned distribution plate in accordance with the embodiment shown in FIG. 8 and previously discussed above.

In one embodiment of the nonwoven fabric 500, the third region 540 comprises crimped continuous filaments, such as those discussed previously in connection with the embodiment shown in FIG. 12. As in the previous embodiments, the crimped continuous filaments help to improve the loft and softness of the nonwoven fabric 500.

Advantageously, first and second regions 520, 530 may comprise non-crimping or low crimping filaments that sandwich the third region 540 of crimped continuous filaments therebetween. In this way, first and second regions 520, 530 help improve the strength, abrasion resistance, and dimensional stability of the nonwoven fabric.

In a further embodiment, first and second regions 520, 530 may define the exterior surfaces of the nonwoven fabric. In certain embodiments, functional additives may be added to one or more of the polymer streams from which the fibers of the first and second regions 520, 530 are formed. In particular, the functionality of the first and second exterior surfaces 525, 535 of the first and second regions 520, 530 can be selectively targeted to have desired properties. For example, in one embodiment the first region 520 can include a colorant, such as a pigment, whereas the second region may include the same colorant, no colorant, or a different colorant than that of the first region.

In certain embodiments, the first and second regions may be identical to each other (i.e., both of the same polymer type) while the third region 540 defines an interior of the stratified fabric layer. In a preferred embodiment, the third region 540 may comprised crimped continuous filaments as discussed previously, while the first and second regions are comprised of non-crimping or low crimping filaments. Advantageously, this embodiment provides exterior surfaces on both sides of the crimped continuous filaments so that the overall strength and dimensional stability of the stratified fabric layer may be improved.

In addition, all three regions 520, 530, and 540 may each be of a different fiber type. In this embodiment, the stratified fabric would provide two distinct exterior surfaces having different properties. In some embodiments, the fiber type of one or more of first and second regions 520, 530 could be selected to be joined with an additional polymer layer, such as an additional nonwoven fabric or film. This can be advantageous for a number of applications, such as providing compatible surface polymers in a stacked composite structure or providing a bio-based polymer that is intended to be a body contacting surface.

In certain embodiments, the nonwoven fabric 500 may have a basis weight ranging from about 8 to 65 grams per square meter (gsm), and in particular, from about 10 to 40 gsm. In a preferred embodiment, the nonwoven fabric 500 has a basis weight of about 15 to 30 gsm.

Figure 16:
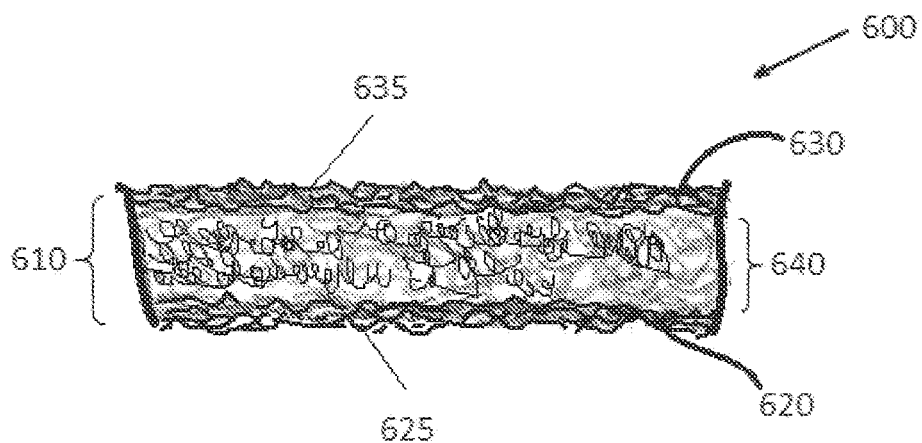

With reference to FIG. 16, a nonwoven fabric 600 is shown having three regions of different fiber type in which each region extends in the cross direction of the nonwoven fabric. In certain embodiments, nonwoven fabric 600 may be prepared with the zoned distribution plate depicted in FIG. 9, which is discussed previously.

The nonwoven fabric 600 includes a stratified fabric layer 610 that is formed as a single layer from a single spin beam. The stratified fabric layer includes a first region 620 of one fiber type, a second region 630 of one fiber type, and a third region 640 of one fiber type that is of a different fiber type than both of first and second regions 620, 630. In one embodiment, the first region 620 is of a different fiber type than the second region 630. In other embodiments, first region 620 and second region 630 may be of the same fiber type.

The first region comprises exterior surface 625 of the nonwoven fabric 600, and the second region 630 comprises an exterior surface 635 of the nonwoven fabric.

As in the previously discussed embodiments, each of the first, second, and third regions of the stratified fabric layer may comprise a variety of different structures (e.g., monocomponent or multicomponent), different composition (e.g., polymers, chemistries, or functional additives), and different properties (e.g., loft, density, basis weight, hydrophilicity/hydrophobicity, and the like).

In certain embodiments, the first and second regions 620, 630 may be identical to each other (i.e., both of the same polymer type) while the third region 640 defines an interior of the stratified fabric layer. In a preferred embodiment, the third region 640 may comprised crimped continuous filaments as discussed previously, while the first and second regions are comprised of non-crimping or low crimping filaments. Advantageously, this embodiment provides exterior surfaces on both sides of the crimped continuous filaments so that the overall strength, abrasion resistance, and dimensional stability of the stratified fabric layer may be improved.

Figure 16A:
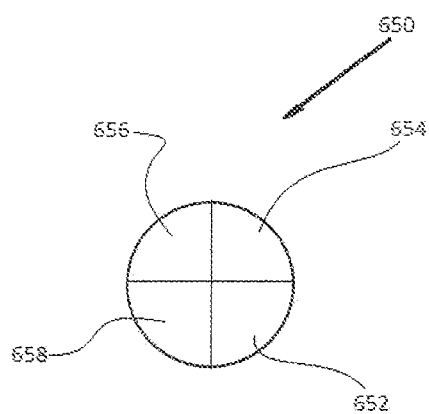
FIG. 16a is a cross-sectional view of a multicomponent fiber in accordance with an embodiment of the invention.

In one particular embodiment, first and second regions 620, 630 each comprise a multicomponent filament having a segmented pie cross-section. In this regard, FIG. 16a depicts a cross-section of a multicomponent filament 650 having a plurality of pie segments 652, 654, 656, 658. In a preferred embodiment, the multicomponent filament 650 comprise a first pair opposing segments (e.g., 652, 656) that are of the same polymer type as each other, and a second pair of opposing segments (e.g., 654, 658) that are of the same polymer type as each other, and in which the first pair of segments is of a different polymer type than the second pair of segments.

Advantageously, regions comprising multicomponent filaments having a segmented pie cross-section can be treated (such as subjected to needle punching, hydroentanglement, or chemical method) to cause the segments to fracture and form filaments of individual segments having a reduced denier in comparison to the non-fractured filaments. For example, a filament having five segments and a denier of 2.0 can be fractured to form 5 filaments of a denier of 0.4. This will result in a single fabric layer having a mix of fine deniers from first and second regions 620, 630, and a region having a more course denier from the third region 640. Such a fabric may be particularly useful in filtration applications, or as in a surge layer in an absorbent article.

This embodiment having the opposing pairs of segments provides a benefit of being able to form filaments from immiscible polymers. For instance, in one embodiment the first pair of segments may comprise a polypropylene polymer, and the second pair of segments may comprise a polyethylene polymer.

In addition, third region 640 may comprise crimped continuous filaments to help improve the loft and softness of the nonwoven fabric. The third region 640 of stratified fabric layer 610 may comprise the same materials, structure, and configuration, as the first region 220 of nonwoven fabric 200, which is discussed previously. In a preferred embodiment, the crimped continuous filaments of third region 640 comprise bicomponent filaments having a side-by-side configuration in which a first polymer component of the bicomponent fibers comprises a metallocene catalyzed polypropylene having an MFR from 19 to 40 g/min, and the other second polymer component comprises a Ziegler-Natta catalyzed polypropylene having an MFR from about 20 to 35 g/10 min.

In certain embodiments, the nonwoven fabric 600 may have a basis weight ranging from about 8 to 65 grams per square meter (gsm), and in particular, from about 10 to 40 gsm. In a preferred embodiment, the nonwoven fabric 600 has a basis weight of about 15 to 30 gsm.

In certain embodiments, the first and second regions may each comprise from about 10 to 20 weight percent of nonwoven fabric 600, and in particular from about 12 to 18 weight percent, based on the total weight of the nonwoven fabric. The third region 640 may comprise about 60 to 80 weight percent, and in particular, from about 64 to 76 weight percent of nonwoven fabric 600, based on the total weight of the nonwoven fabric.

Figure 17:
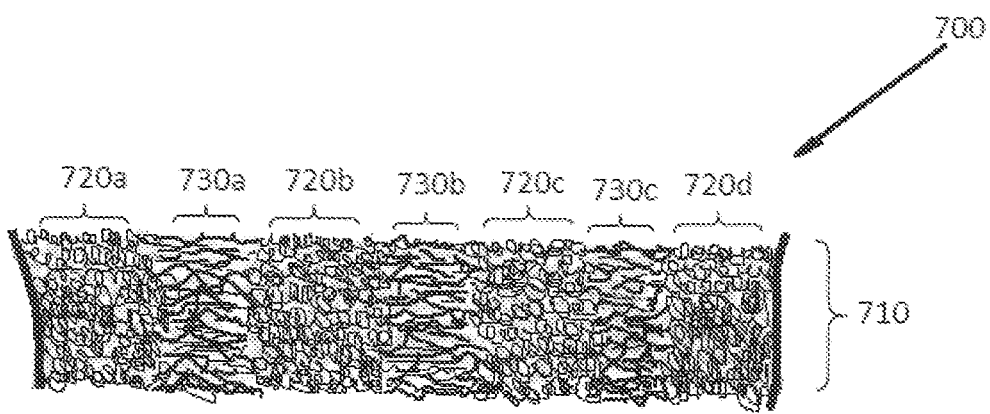

With reference to FIG. 17, a nonwoven fabric 700 is depicted having a plurality of regions of different fiber types that extend in the machine direction of the nonwoven fabric. In certain embodiments, nonwoven fabric 700 may be prepared with the zoned distribution plate depicted in FIG. 11, which is discussed previously.

In the illustrated embodiment, the nonwoven fabric 700 comprises a stratified fabric layer 710 having a first series of alternating regions of one fiber type (e.g., 720a, 720b, 720c, 720d . . . ) extending in the machine direction, and a second series of alternating regions of a different fiber type (e.g., 730a, 730b, 730c . . . ) extending in the machine direction, and in which the first and second series comprise filaments of a different fiber type.

In one particular embodiment, the first series of alternating regions of fiber type comprises crimped continuous filaments, and the second series of alternating regions of fiber type comprise non-crimping or low crimping filaments.

Examples of crimped continuous filaments that may be used in this embodiment are discussed previously. For example, the crimped continuous filaments may comprise bicomponent filaments having a side-by-side configuration in which a first polymer component of the bicomponent fibers comprises a metallocene catalyzed polypropylene having an MFR from 19 to 40 g/min, and the other second polymer component comprises a Ziegler-Natta catalyzed polypropylene having an MFR from about 20 to 35 g/10 min.

Examples of non-crimping or low crimping filaments that may be used for the second series of alternating regions (e.g., 730a, 730b, 730c . . . ) are discussed previously. For example, the non-crimping or low-crimping filaments may comprise monocomponent fibers or multicomponent fibers that typically do not develop crimp, such as a centric sheath/core configuration. In one embodiment, the filaments of the second series of alternating regions (e.g., 730a, 730b, 730c . . . ) may comprise a Ziegler-Natta catalyzed homopolymer polypropylene having an MFR from about 20 to 35 g/10 min., and in particular an MFR of about 25 g/10 min. In one embodiment, the polymer comprising the filaments of the second series of alternating regions may be the same Ziegler-Natta catalyzed polypropylene used as a second polymer component in the bicomponent filaments in the first series of alternating regions (e.g., 720*a*, 720*b*, 720*c*, 720*d* . . . ).

Advantageously, the nonwoven fabric 700 may help improve the dimensional stability of the fabric in the cross direction via the strain resisting non-crimping or low crimping filaments of the second series of alternating regions (e.g., 730*a*, 730*b*, 730*c* . . . ).

The nonwoven fabric 700 may be useful in preparing a nonwoven fabric having zoned regions of hydrophilicity/hydrophobicity as well as other functional enhancements.

In certain embodiments, the nonwoven fabric 700 may have a basis weight ranging from about 8 to 65 grams per square meter (gsm), and in particular, from about 10 to 30 gsm. In a preferred embodiment, the nonwoven fabric 700 has a basis weight of about 15 to 40 gsm.

The above examples are provided to illustrate various embodiments that are within the scope of the invention and should not be construed as limiting the invention to the specific embodiments disclosed. It should be recognized that a variety of different nonwoven fabrics having a stratified fabric layer may be prepared in accordance with embodiments of the invention.

In addition to the polypropylene and polyethylene polymers discussed above, embodiments of the invention may also be prepared with a wide variety of different polymers and polymeric blends. Examples of suitable polymers for preparing the fibers may polyolefins, such as polypropylene and polyethylene, and copolymers thereof, polyesters, such as polyethylene terephthalate (PET), polytrimethylene terephthalate (PTT), and polybutylene terephthalate (PBT), nylons, polystyrenes, polyurethanes, copolymers, and blends thereof, and other synthetic polymers that may be used in the preparation of fibers.

In embodiments comprising crimped filaments, polypropylene, polypropylene blends, and copolymers thereof may advantageously be employed. In certain embodiments, the propylene polymers are crystalline propylene polymers based on propylene, with examples including propylene homopolymers and propylene/α-olefin random copolymers of propylene and one or more α-olefins such as ethylene, 1-butene, 1-pentene, 1-hexene, 1-octene, 1-decene, 3-methyl-1-butene, 3-methyl-1-pentene, 3-ethyl-1-pentene, 4-methyl-1-pentene and 4-methyl-1-hexene, for example propylene/ethylene random copolymers and propylene/ethylene/1-butene random copolymers.

In further embodiments, the nonwoven fabric having a stratified fabric layer comprising a plurality of different fiber types may be prepared from sustainable polymers. In contrast to polymers derived from petroleum sources, sustainable polymers are generally derived from a bio-based material. In some embodiments, a sustainable polymer may also be considered biodegradable. A special class of biodegradable product made with a bio-based material might be considered as compostable if it can be degraded in a composting environment. The European standard EN 13432, "Proof of Compostability of Plastic Products" may be used to determine if a fabric or film comprised of sustainable content could be classified as compostable.

In one such embodiment, the nonwoven fabric having a stratified fabric layer comprises fibers comprising a sustainable polymer. In certain embodiments, the fibers are substantially free of synthetic materials, such as petroleum-based materials and polymers. For example, fibers comprising the nonwoven fabric may have less than 25 weight percent of materials that are non-bio-based, and more preferably, less than 20 weight percent, less than 15 weight percent, less than 10 weight percent, and even more preferably, less than 5 weight percent of non-bio-based materials, based on the total weight of the nonwoven fabric.

In one embodiment, sustainable polymers for use may include aliphatic polyester based polymers, such as polylactic acid, and bio-based derived polyethylene.

Aliphatic polyesters useful in the present invention may include homo- and copolymers of poly(hydroxyalkanoates), and homo- and copolymers of those aliphatic polyesters derived from the reaction product of one or more polyols with one or more polycarboxylic acids that are typically formed from the reaction product of one or more alkanediols with one or more alkanedicarboxylic acids (or acyl derivatives). Polyesters may further be derived from multifunctional polyols, e.g. glycerin, sorbitol, pentaerythritol, and combinations thereof, to form branched, star, and graft homo- and copolymers. Polyhydroxyalkanoates generally are formed from hydroxyacid monomeric units or derivatives thereof. These include, for example, polylactic acid, polyhydroxybutyrate, polyhydroxyvalerate, polycaprolactone and the like. Miscible and immiscible blends of aliphatic polyesters with one or more additional semicrystalline or amorphous polymers may also be used.

One useful class of aliphatic polyesters are poly(hydroxyalkanoates), derived by condensation or ring-opening polymerization of hydroxy acids, or derivatives thereof. Suitable poly(hydroxyalkanoates) may be represented by the formula: $H(O—R—C(O)—)_n OH$ where R is an alkylene moiety that may be linear or branched having 1 to 20 carbon atoms, preferably 1 to 12 carbon atoms optionally substituted by catenary (bonded to carbon atoms in a carbon chain) oxygen atoms; n is a number such that the ester is polymeric, and is preferably a number such that the molecular weight of the aliphatic polyester is at least 10,000, preferably at least 30,000, and most preferably at least 50,000 daltons. In certain embodiments, the molecular weight of the aliphatic polyester is typically less than 1,000,000, preferably less than 500,000, and most preferably less than 300,000 daltons. R may further comprise one or more caternary (i.e. in chain) ether oxygen atoms. Generally, the R group of the hydroxy acid is such that the pendant hydroxyl group is a primary or secondary hydroxyl group.

Useful poly(hydroxyalkanoates) include, for example, homo- and copolymers of poly(3-hydroxybutyrate), poly(4-hydroxybutyrate), poly(3-hydroxyvalerate), poly(lactic acid) (as known as polylactide), poly(3-hydroxypropanoate), poly(4-hydropentanoate), poly(3-hydroxypentanoate), poly(3-hydroxyhexanoate), poly(3-hydroxyheptanoate), poly(3-hydroxyoctanoate), polydioxanone, polycaprolactone, and polyglycolic acid (i.e. polyglycolide). Copolymers of two or more of the above hydroxy acids may also be used, for example, poly(3-hydroxybutyrate-co-3-hydroxyvalerate), poly(lactate-co-3-hydroxypropanoate), poly(glycolide-co-p-dioxanone), and poly(lactic acid-co-glycolic acid). Blends of two or more of the poly(hydroxyalkanoates) may also be used, as well as blends with one or more semicrystalline or amorphous polymers and/or copolymers.

The aliphatic polyester may be a block copolymer of poly(lactic acid-co-glycolic acid). Aliphatic polyesters useful in the inventive compositions may include homopolymers, random copolymers, block copolymers, star-branched random copolymers, star-branched block copolymers, dendritic copolymers, hyperbranched copolymers, graft copolymers, and combinations thereof.

Another useful class of aliphatic polyesters includes those aliphatic polyesters derived from the reaction product of one or more alkanediols with one or more alkanedicarboxylic acids (or acyl derivatives). Such polyesters have the general formula:

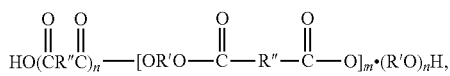

where R' and R" each represent an alkylene moiety that may be linear or branched having from 1 to 20 carbon atoms, preferably 1 to 12 carbon atoms, and m is a number such that the ester is polymeric, and is preferably a number such that the molecular weight of the aliphatic polyester is at least 10,000, preferably at least 30,000, and most preferably at least 50,000 daltons, but less than 1,000,000, preferably less than 500,000 and most preferably less than 300,000 daltons. Each n is independently 0 or 1. R' and R" may further comprise one or more caternary (i.e. in chain) ether oxygen atoms.

Examples of aliphatic polyesters include those homo- and copolymers derived from (a) one or more of the following diacids (or derivative thereof): succinic acid; adipic acid; 1,12 dicarboxydodecane; fumaric acid; glutartic acid; diglycolic acid; and maleic acid; and (b) one or more of the following diols: ethylene glycol; polyethylene glycol; 1,2-propane diol; 1,3-propanediol; 1,2-propanediol; 1,2-butanediol; 1,3-butanediol; 1,4-butanediol; 2,3-butanediol; 1,6-hexanediol; 1,2 alkane diols having 5 to 12 carbon atoms; diethylene glycol; polyethylene glycols having a molecular weight of 300 to 10,000 daltons, and preferably 400 to 8,000 daltons; propylene glycols having a molecular weight of 300 to 4000 daltons; block or random copolymers derived from ethylene oxide, propylene oxide, or butylene oxide; dipropylene glycol; and polypropylene glycol, and (c) optionally a small amount, i.e., 0.5-7.0 mole percent of a polyol with a functionality greater than two, such as glycerol, neopentyl glycol, and pentaerythritol.

Such polymers may include polybutylene succinate homopolymer, polybutylene adipate homopolymer, polybutyleneadipate-succinate copolymer, polyethylenesuccinate-adipate copolymer, polyethylene glycol succinate homopolymer and polyethylene adipate homopolymer.

Commercially available aliphatic polyesters include poly (lactide), poly(glycolide), poly(lactide-co-glycolide), poly (L-lactide-co-trimethylene carbonate), poly(dioxanone), poly(butylene succinate), and poly(butylene adipate).

The term "aliphatic polyester" covers—besides polyesters which are made from aliphatic and/or cycloaliphatic components exclusively also polyesters which contain besides aliphatic and/or cycloaliphatic units, aromatic units, as long as the polyester has substantial sustainable content.

In addition to PLA based resins, nonwoven fabrics in accordance with embodiments of the invention may include other polymers derived from an aliphatic component possessing one carboxylic acid group and one hydroxyl group, which are alternatively called polyhydroxyalkanoates (PHA). Examples thereof are polyhydroxybutyrate (PHB), poly-(hydroxybutyrate-co-hydroxyvaleterate) (PHBV), poly-(hydroxybutyrate-co-polyhydroxyhexanoate) (PHBH), polyglycolic acid (PGA), poly-(epsilon-caprolactione) (PCL) and preferably polylactic acid (PLA).

Examples of additional polymers that may be used in embodiments of the invention include polymers derived from a combination of an aliphatic component possessing two carboxylic acid groups with an aliphatic component possessing two hydroxyl groups, and are polyesters derived from aliphatic diols and from aliphatic dicarboxylic acids, such as polybutylene succinate (PBSU), polyethylene succinate (PESU), polybutylene adipate (PBA), polyethylene adipate (PEA), polytetramethy-lene adipate/terephthalate (PTMAT).

Useful aliphatic polyesters include those derived from semicrystalline polylactic acid. Poly(lactic acid) or polylactide (PLA) has lactic acid as its principle degradation product, which is commonly found in nature, is non-toxic and is widely used in the food, pharmaceutical and medical industries. The polymer may be prepared by ring-opening polymerization of the lactic acid dimer, lactide. Lactic acid is optically active and the dimer appears in four different forms: L,L-lactide, D,D-lactide, D,L-lactide (meso lactide) and a racemic mixture of L,L- and D,D-. By polymerizing these lactides as pure compounds or as blends, poly(lactide) polymers may be obtained having different stereochemistries and different physical properties, including crystallinity. The L,L- or D,D-lactide yields semicrystalline poly (lactide), while the poly(lactide) derived from the D,L-lactide is amorphous.

Generally, polylactic acid based polymers are prepared from dextrose, a source of sugar, derived from field corn. In North America corn is used since it is the most economical source of plant starch for ultimate conversion to sugar. However, it should be recognized that dextrose can be derived from sources other than corn. Sugar is converted to lactic acid or a lactic acid derivative via fermentation through the use of microorganisms. Lactic acid may then be polymerized to form PLA. In addition to corn, other agriculturally-based sugar sources may be used including rice, sugar beets, sugar cane, wheat, cellulosic materials, such as xylose recovered from wood pulping, and the like.

The polylactide preferably has a high enantiomeric ratio to maximize the intrinsic crystallinity of the polymer. The degree of crystallinity of a poly(lactic acid) is based on the regularity of the polymer backbone and the ability to crystallize with other polymer chains. If relatively small amounts of one enantiomer (such as D-) is copolymerized with the opposite enantiomer (such as L-) the polymer chain becomes irregularly shaped, and becomes less crystalline. For these reasons, when crystallinity is favored, it is desirable to have a poly(lactic acid) that is at least 85% of one isomer, at least 90% of one isomer, or at least 95% of one isomer in order to maximize the crystallinity.

In some embodiments, an approximately equimolar blend of D-polylactide and L-polylactide is also useful. This blend forms a unique crystal structure having a higher melting point (about 210° C.) than does either the D-poly(lactide) and L-(polylactide) alone (about. 190° C.), and has improved thermal stability.

Copolymers, including block and random copolymers, of poly(lactic acid) with other aliphatic polyesters may also be used. Useful co-monomers include glycolide, beta-propiolactone, tetramethylglycolide, beta-butyrolactone, gamma-butyrolactone, pivalolactone, 2-hydroxybutyric acid, alpha-hydroxyisobutyric acid, alpha-hydroxyvaleric acid, alpha-hydroxyisovaleric acid, alpha-hydroxycaproic acid, alpha-hydroxyethylbutyric acid, alpha-hydroxyisocaproic acid, alpha-hydroxy-beta-methylvaleric acid, alpha-hydroxyoctanoic acid, alpha-hydroxydecanoic acid, alpha-hydroxymyristic acid, and alpha-hydroxystearic acid.

Blends of poly(lactic acid) and one or more other aliphatic polyesters, or one or more other polymers may also be used. Examples of useful blends include poly(lactic acid) and poly(vinyl alcohol), polyethylene glycol/polysuccinate, polyethylene oxide, polycaprolactone and polyglycolide.

In certain preferred embodiments, the aliphatic polyester component comprises a PLA based resin. A wide variety of different PLA resins may be used to prepare nonwoven fabrics in accordance with embodiments of the invention. The PLA resin should have proper molecular properties to be spun in spunbond processes. Examples of suitable include PLA resins are supplied from Nature Works LLC, of Minnetonka, Minn. 55345 such as, grade 6752D, 6100D, and 6202D, which are believed to be produced as generally following the teaching of U.S. Pat. Nos. 5,525,706 and 6,807,973 both to Gruber et al. Other examples of suitable PLA resins may include L130, L175, and LX175, all from Corbion of Arkelsedijk 46, 4206 A C Gorinchem, the Netherlands.

In some embodiments, the inventive nonwoven fabrics may comprise sustainable polymer components of biodegradable products that are derived from an aliphatic component possessing one carboxylic acid group (or a polyester forming derivative thereof, such as an ester group) and one hydroxyl group (or a polyester forming derivative thereof, such as an ether group) or may be derived from a combination of an aliphatic component possessing two carboxylic acid groups (or a polyester forming derivative thereof, such as an ester group) with an aliphatic component possessing two hydroxyl groups (or a polyester forming derivative thereof, such as an ether group).

Additional nonlimiting examples of bio-based polymers include polymers directly produced from organisms, such as polyhydroxyalkanoates (e.g., poly(beta-hydroxyalkanoate), poly(3-hydroxybutyrate-co-3-hydroxyvalerate, NODAX™), and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

In some embodiments, the bio-based polymer may comprise bio-based polyethylene that is derived from a biological source. For example, bio-based polyethylene can be prepared from sugars that are fermented to produce ethanol, which in turn is dehydrated to provide ethylene. An example of a suitable sugar cane derived polyethylene is available from Braskem S.A. under the product name PE SHA7260.

As discussed previously, embodiments of the nonwoven fabric may include one or more regions in the stratified fabric layer in which the fibers are multicomponent. In certain embodiments, the fibers comprise multicomponent fibers having at least two polymer components arranged in structured domains across the cross section of the fiber. As is generally well known to those skilled in the art, polymer domains or components are arranged in substantially continuously positioned zones across the cross-section of the multicomponent fiber and extend continuously along the length of the multicomponent fiber. More than two components could be present in the multicomponent fiber.

A preferred configuration is side-by-side arrangement in which a first polymer component occupies one side of the fiber, and a second polymer component occupies the other side of the fiber.

Another preferred configuration is a sheath/core arrangement wherein a first component, the sheath, substantially surrounds a second component, the core. The resulting sheath/core bicomponent fiber may have a round or non-round cross-section. Other structured fiber configurations as known in the art can be used including segmented pie, islands-in-the-sea and tipped multilobal structures.

In certain embodiments, the fibers are bicomponent in which a first polymer component defines a sheath of the fiber, and a second polymer component defines a core of the fiber. Generally, the weight percentage of the sheath to that of the core in the fibers may vary widely depending upon the desired properties of the carded nonwoven fabric. For example the weight ratio of the sheath to the core may vary between about 5:95 to 95:5, such as from about 10:90 to 90:10, and in particular from about 20:80 to 80:20. In a preferred embodiment, the weight ratio of the sheath to the core is about 25:75 to 35:65, with a weight ratio of about 20:80 to 50:50 being preferred.

Nonwoven fabrics having a stratified fabric layer in accordance with embodiments of the invention may be used to prepare a variety of different structures. For example, the nonwoven fabric having a stratified fabric layer may be joined with one or more additional nonwoven fabric or film layers to form a composite sheet material. Examples of additional nonwoven fabrics may include spunbond fabrics, airlaid fabrics, meltblown fabrics, carded fabrics, spunlace fabrics, and the like.

In some embodiments, the inventive nonwoven fabric may be combined with one or more additional layers to prepare a composite or laminate material. Examples of such composites/laminates may include a spunbond composite, a spunbond-meltblown (SM) composite, a spunbond-meltblown-spunbond (SMS) composite, or a spunbond-meltblown-meltblown-spunbond (SMMS) composite. In some embodiments, composites may be prepared comprising a layer of the inventive nonwoven fabric and one or more film layers.

Figure 18A:
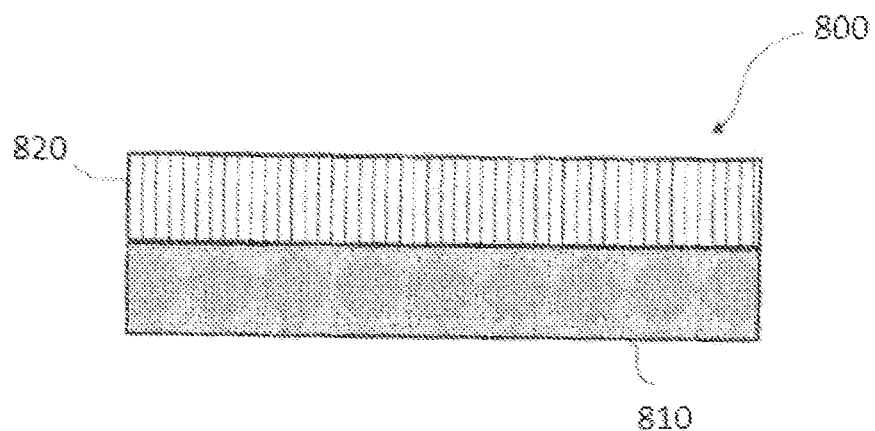
FIGS. 18A-18D illustrate various composite fabric structures in accordance with one or more embodiments of the present invention.

For example, FIGS. 18A-18D are cross-sectional views of composites in accordance with certain embodiments of the invention. FIG. 18A illustrates a spunbond-meltblown (SM) composite 800 having a nonwoven fabric 810 with a stratified fabric layer in accordance with embodiments of the present invention, and a meltblown layer 820.

Figure 18B:
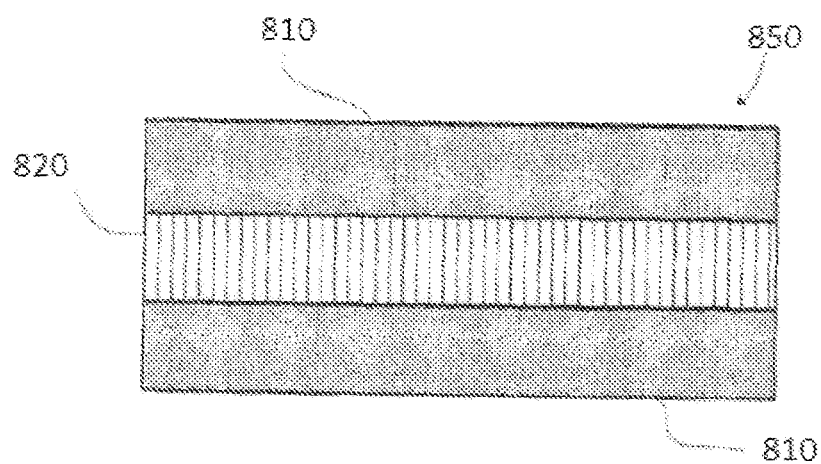

FIG. 18B illustrates a spunbond-meltblown-spunbond (SMS) composite 850 having two spunbond nonwoven fabric layers 810 that are in accordance with embodiments of the invention and a meltblown layer 820 sandwiched between the inventive spunbond nonwoven fabric layers 810.

Figure 18C:
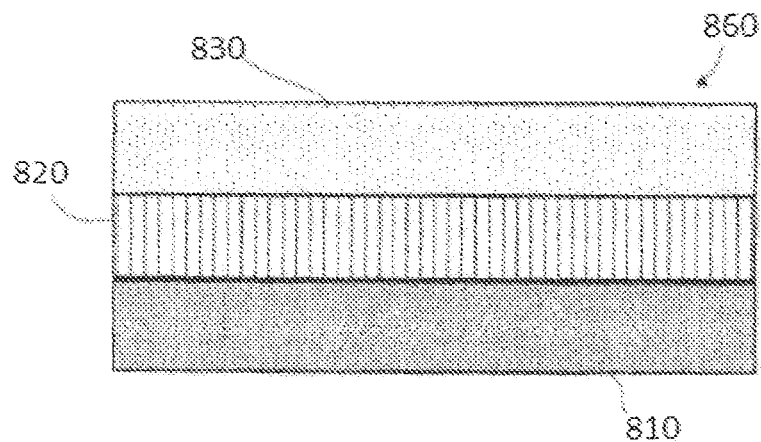

FIG. 18C illustrates an SMS composite 860 having an inventive spunbond nonwoven fabric layer 810, a different spunbond layer 830, and a meltblown layer 820 sandwiched between the two spunbond layers 810, 830.

Figure 18D:
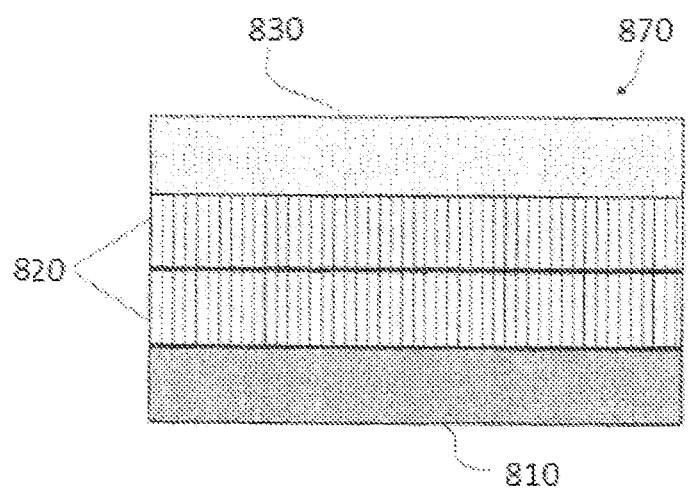

Finally, FIG. 18D illustrates a spunbond-meltblown-meltblown-spunbond (SMMS) composite 870 having an inventive spunbond nonwoven fabric layer 810, a different spunbond layer 830, and two meltblown layers 820 sandwiched between the two spunbond layers 810, 830. Although the SMMS composite 870 is shown as having two different spunbond layers 810 and 830, both spunbond layers may be the inventive spunbond nonwoven fabric layer 810.

In these multilayer structures, the basis weight of the inventive spunbond nonwoven fabric layer may range from as low as 3 g/m² and up to 80 g/m². In such multilayered laminates, both the meltblown and exterior region of the inventive nonwoven fabric may include the same polymer on the surface to insure optimum bonding. In some embodiments in which the inventive spunbond layer is a part of a multilayer structure (e.g., SM, SMS, and SMMS), the amount of the meltblown in the structure may range from about 5 to 30%, and in particular, from about 5 to 15% of the structure as a percentage of the structure as a whole.

Another potential composite may have a meltblown-spunbond-meltblown (MSM) configuration in which the spunbond comprises a single fabric layer having a plurality of fiber types.

Multilayer structures in accordance with embodiments can be prepared in a variety of manners including continuous in-line processes where each layer is prepared in successive order on the same line, or depositing a meltblown layer on a previously formed spunbond layer. The layers of the multilayer structure can be bonded together to form a multilayer composite sheet material using thermal bonding, mechanical bonding, adhesive bonding, hydroentangling, or combinations of these. In certain embodiments, the layers are thermally point bonded to each other by passing the multilayer structure through a pair of calender rolls.

Nonwoven fabrics prepared in accordance with embodiments of the invention may be used in wide variety of articles and applications. For instance, embodiments of the invention may be used for personal care applications, for example products for babycare (diapers, wipes), for femcare (pads, sanitary towels, tampons), for adult care (incontinence products), or for cosmetic applications (pads), agricultural applications, for example root wraps, seed bags, crop covers, industrial applications, for example work wear coveralls, airline pillows, automobile trunk liners, sound proofing, and household products, for example mattress coil covers and furniture scratch pads.

EXAMPLES

The following examples are provided for illustrating one or more embodiments of the present invention and should not be construed as limiting the invention.

The following materials were used in the examples.

"PP-1" refers to a Zeigler-Natta polypropylene homopolymer having a MFR of 34 g/10 min. as measured with ASTM D1238, which is available from Braskem under the product name CP360H.

"PP-2" refers to a metallocene catalyzed polypropylene having a MFR of 24 g/10 min. as measured with ASTM D1238, which is available from Exxon under the product name ACHIEVE® 3854.

Control Example 1

In this control example, a single layer spunbond fabric was prepared. The spunbond beam included a standard distribution plate configured to produce sheath/core filaments at a sheath core ratio of 70.30. The sheath comprised PP-1 and the core comprised PP-2 Following filament formation, the filaments were collected on a collection surface and calender bonded with a CD rod bond pattern with a calender bonding unit having a CD rod bond pattern.

Inventive Example 1

In Inventive Example 1, a single layer spunbond fabric comprising a plurality of fiber types was prepared. The spunbond beam included a zoned distribution plate configured to produce bicomponent filaments having a side-by-side (SBS) configuration and bicomponent filaments having a sheath/core (S/C) configuration. The ratio of SBS filaments to S/C filaments in the zoned distribution plate was 80:20.

The SBS filaments comprised 70% by weight of PP-2 and 30% by weight of PP-1. The sheath/core filaments were the same as those in Control Example 1, discussed above Following filament formation, the filaments were collected on a collection surface and calender bonded with a calender bonding unit having a CD rod bond pattern.

Figure 19:
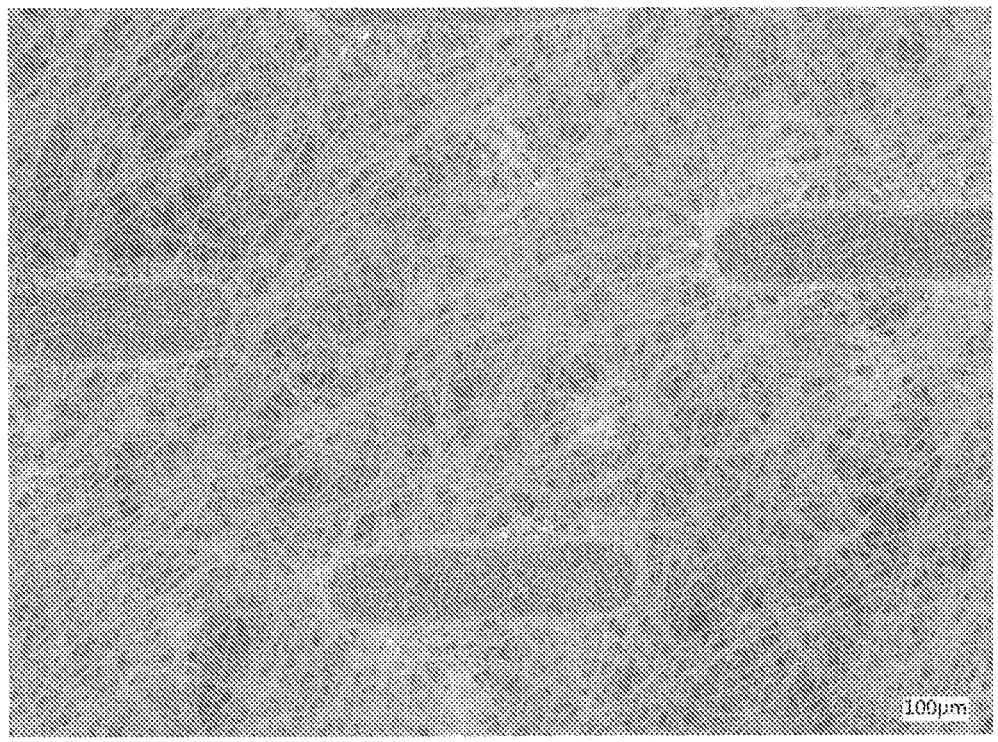
FIG. 19 is a magnified image of surface of a spunbond nonwoven having a single fiber type.
Figure 20:
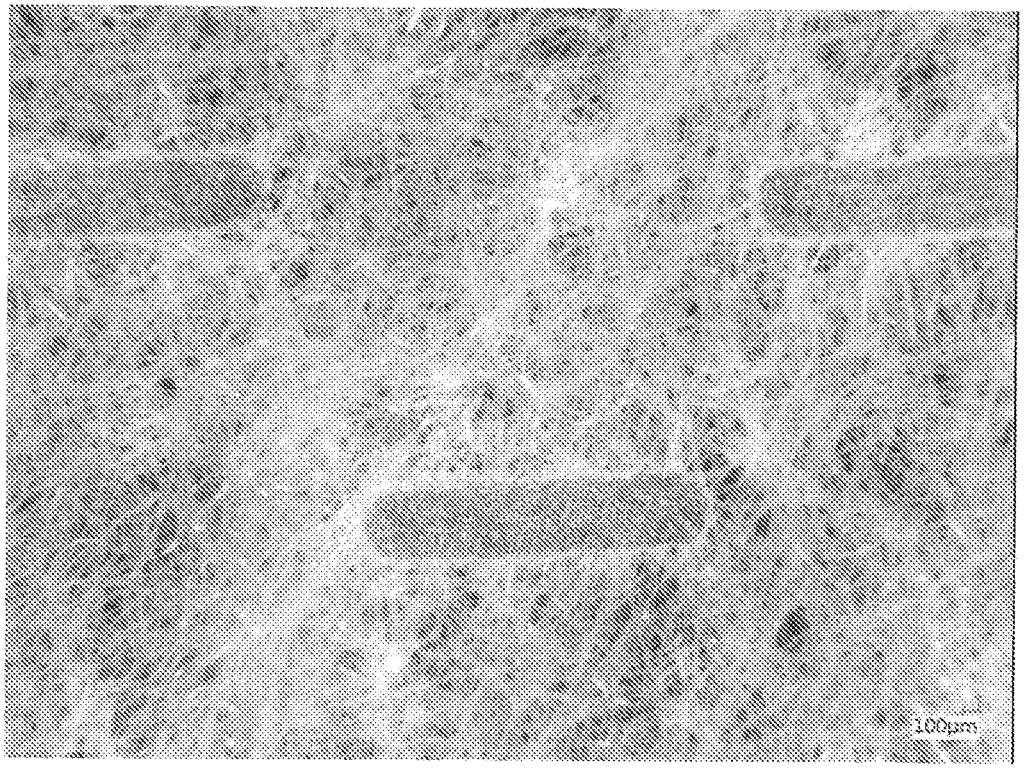
FIG. 20 is a magnified image of surface of a spunbond nonwoven having two different fiber types.

The resulting fabrics were evaluated for the development of crimp using a Keyence VHX-5000 microscope at 50× magnification. The results are provided in FIGS. 19 and 20 (Control Example 1 and Inventive Example 1, respectively). The image in FIG. 19 is of the single layer spunbond fabric having a single fiber type (i.e., S/C filaments). In the fabric of Control Example 1, the filaments exhibit little, if any, crimp. In contrast, FIG. 20 is an image of a single layered spunbond fabric having two different fiber types in which a significant proportion of the filaments exhibit crimp (SBS filaments) while a minor proportion of the filaments (S/C filaments) exhibit little, if any, crimp as in the filaments of Control Example 1. As can be seen in FIG. 20, the zoned distribution plate can be used to produce fabrics having a single layer with a plurality of different fiber types.

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for preparing a nonwoven fabric having a single fabric layer in which
the single fabric layer comprises a plurality of different fiber types, the system comprising:
a first polymer source configured to provide a stream of a molten or semi-molten first polymer;
a second polymer source configured to provide a stream of a molten or semi-molten second polymer, wherein the first polymer and the second polymer are of a different type;
a first spin beam in fluid communication with the first and second polymer sources, the spin beam including a zoned distribution plate disposed upstream of a spinneret, the zoned distribution plate comprising a plurality of distribution apertures arranged in zones, wherein each zone is configured and arranged to extrude a plurality of polymer streams that are of a different polymer type than polymer streams extruded by an adjacent zone to the spinneret, wherein the zoned distribution plate comprises a first distribution zone configured to produce non-crimping or low crimping filaments and a second distribution zone configured to produce crimped filaments.

2. The system according to claim 1, wherein the first distribution zone is configured to produce non-crimping or low crimping multicomponent filaments having a sheath/core configuration, and the second distribution zone is configured to produce crimping multicomponent filaments having a side-by-side or eccentric configuration.

3. The system according to claim 1, wherein the zoned distribution plate comprises a plurality of zones extending longitudinally in the cross direction of the spin beam.

4. The system according to claim 1, wherein the zoned distribution plate comprises a plurality of zones extending laterally in the machine direction of the spin beam.

5. The system according to claim 1, further comprising a third polymer source in fluid communication with the spin beam, the third polymer source configured to provide a stream of a molten or semi-molten third polymer.

6. The system according to claim 1, wherein the first polymer source comprises a first polypropylene polymer and the second polymer source comprises a second polypropylene that is different than the first polypropylene.

7. The system according to claim 1, further comprising one or more additional fiber producing beams disposed upstream or downstream of the first spin beam, the one or more additional fiber producing beams being configured to produce additional nonwoven layers that are disposed under said single fabric layer comprises a plurality of different fiber types or overlying said single fabric layer comprises a plurality of different fiber types.

8. The system according to claim 7, wherein said additional nonwoven layers are selected from the group consisting of a spunbond nonwoven, airlaid nonwoven, meltblown nonwoven, co-formed nonwoven, carded nonwoven, and spunlace nonwoven.

9. The system according to claim 8, wherein said additional nonwoven layers comprises a spunmelt nonwoven comprising a single or a plurality of different fiber types.

10. The system according to claim 1, wherein one or more of the first and second polymer comprises a bio-based polymer.

11. The system according to claim 1, wherein said single fabric layer comprises a plurality of different fiber types is joined to a film layer.

12. A system for preparing a nonwoven fabric having a single fabric layer in which the single fabric layer comprises a plurality of different fiber types, the system comprising:
  a first polymer source configured to provide a stream of a molten or semi-molten first polymer;
  a second polymer source configured to provide a stream of a molten or semi-molten second polymer, wherein the first polymer and the second polymer are of a different type;
  a first spin beam in fluid communication with the first and second polymer sources, the spin beam including a zoned distribution plate disposed upstream of a spinneret, the zoned distribution plate comprising a plurality of distribution apertures arranged in zones, wherein each zone is configured and arranged to extrude a plurality of polymer streams that are of a different polymer type than polymer streams extruded by an adjacent zone to the spinneret, wherein the zoned distribution plate has one of the following zoned distribution configurations:
  a. a first zoned distribution configuration comprising first and second distribution zones in fluid communication with the first polymer source, the first and second distribution zones of the first zoned distribution configuration being configured to produce multicomponent or monocomponent filaments, and a third distribution zone disposed between the first and second distribution zones of the first zoned distribution configuration, the third distribution zone being in fluid communication with both the first and second polymer sources, and being configured to produce multicomponent filaments, and
  b. a second zoned distribution configuration comprising first and second distribution zones in fluid communication with both the first and second polymer sources, the first and second distribution zones of the second zoned distribution configuration being configured to produce multicomponent filaments, and a third distribution zone disposed between the first and second distribution zones and in fluid communication with the first polymer source, the third distribution zone of the second zoned distribution configuration being configured to produce monocomponent filaments or multicomponent filaments;
  a collection surface disposed below the spinneret onto which continuous filaments are deposited to form a single layer comprising two or more types of fibers that are of a different type from each other; and
  one or more fiber producing beams disposed upstream or downstream of the first spin beam, the one or more fiber producing beams being configured to produce one or more additional nonwoven layers that are disposed under said single fabric layer comprises a plurality of different fiber types or overlying said single fabric layer comprises a plurality of different fiber types.

13. The system according to claim 12, wherein the one or more additional nonwoven layers are selected from the group consisting of a spunbond nonwoven, airlaid nonwoven, co-formed nonwoven, meltblown nonwoven, carded nonwoven, and spunlace nonwoven.

14. The system according to claim 13, wherein the one or more additional nonwoven layers comprises a spunmelt nonwoven comprised of crimped filaments, low or non-crimping filaments, or combinations thereof.

15. The system according to claim 12, wherein the zoned distribution plate comprises a plurality of zones extending longitudinally in the cross direction of the spin beam, or the zoned distribution plate comprises a plurality of zones extending laterally in the machine direction of the spin beam.

16. The system according to claim 12, further comprising a third polymer source in fluid communication with the spin beam, the third polymer source configured to provide a stream of a molten or semi-molten third polymer.

17. The system according to claim 12, wherein one or more of the first and second polymer comprises a bio-based polymer.

18. The system according to claim 12, wherein the system is configure to produce a composite structure comprising one or more spunbond nonwoven layers and one or more meltblown layers.

19. The system according to claim 18, wherein the composite structure is selected from the group consisting of spunbond-meltblown (SM), spunbond-meltblown-spunbond (SMS), spunbond-meltblown-meltblown-spunbond (SMMS), and meltblown-spunbond-meltblown (MSM).

20. A system for preparing a nonwoven fabric having a single fabric layer in which the single fabric layer comprises a plurality of different fiber types, the system comprising:
  a first polymer source configured to provide a stream of a molten or semi-molten first polymer;
  a second polymer source configured to provide a stream of a molten or semi-molten second polymer, wherein the first polymer and the second polymer are of a different type;
  a spin beam in fluid communication with the first and second polymer sources, the spin beam including a zoned distribution plate disposed upstream of a spinneret, the zoned distribution plate comprising a plurality of distribution apertures arranged in zones, wherein each zone is configured and arranged to extrude a plurality of polymer streams that are of a different polymer type than polymer streams extruded by an adjacent zone to the spinneret, wherein the zoned distribution plate comprises a first zoned distribution configuration comprising first and second distribution zones in fluid communication with the first polymer source, the first and second distribution zones of the first zoned distribution configuration being configured to produce a first fiber type, and a third distribution zone disposed between the first and second distribution zones of the first zoned distribution configuration, the third distribution zone being in fluid communication with the second polymer source, and being configured to produce a second fiber type that is different from the first fiber type; and a collection surface disposed below the spinneret onto which continuous filaments are deposited to form a single layer comprising two or more types of fibers that are of a different type from each other.

21. The system according to claim 20, further comprising a third polymer source in fluid communication with the spin beam, the third polymer source configured to provide a stream of a molten or semi-molten third polymer.

22. The system according to claim 20, wherein a functional additive is blended with either the first polymer source or the second polymer source, but not with both the first and second polymer sources.

23. The system according to claim 22, wherein in the functional additive is selected from the group consisting of colorants, UV stabilizers, hydrophobic agents, hydrophilic agents, antistatic agent, elastomers, compatibilizers antioxidants, anti-block agent, slip agent, optical brighteners, flame retardants, polymer rheology modifiers, and antimicrobial agents.

* * * * *